(12) United States Patent
Gray et al.

(10) Patent No.: US 11,126,297 B2
(45) Date of Patent: Sep. 21, 2021

(54) ELECTRONIC PEN WITH RING-BACK AND OTHER FUNCTIONALITIES

(71) Applicant: SigmaSense, LLC., Wilmington, DE (US)

(72) Inventors: Patrick Troy Gray, Cedar Park, TX (US); Daniel Keith Van Ostrand, Leander, TX (US)

(73) Assignee: SigmaSense, LLC., Wilmington, DE (US)

( * ) Notice: Subject to any disclaimer, the term of this patent is extended or adjusted under 35 U.S.C. 154(b) by 0 days.

(21) Appl. No.: 17/062,043

(22) Filed: Oct. 2, 2020

(65) Prior Publication Data

US 2021/0034214 A1 Feb. 4, 2021

Related U.S. Application Data

(63) Continuation-in-part of application No. 16/445,420, filed on Jun. 19, 2019, which is a continuation-in-part of application No. 16/436,698, filed on Jun. 10, 2019.

(Continued)

(51) Int. Cl.
*G06F 3/041* (2006.01)
*G06F 3/044* (2006.01)
*G06F 3/0354* (2013.01)

(52) U.S. Cl.
CPC ...... *G06F 3/04162* (2019.05); *G06F 3/03545* (2013.01); *G06F 3/0441* (2019.05); *G06F 3/0442* (2019.05)

(58) Field of Classification Search
None
See application file for complete search history.

(56) References Cited

U.S. PATENT DOCUMENTS 5,414,227 A * 5/1995 Schubert ............. G06F 3/03545
178/19.01
5,877,459 A * 3/1999 Prater ................. G06F 3/03545
178/19.06

(Continued)

FOREIGN PATENT DOCUMENTS

| CN | 103995626 A | 8/2014 |
| CN | 104182105 A | 12/2014 |
| WO | 2013165466 A1 | 11/2013 |

OTHER PUBLICATIONS

Baker; How delta-sigma ADCs work, Part 1; Analog Applications Journal; Oct. 1, 2011; 6 pgs.

(Continued)

*Primary Examiner* — Laurence J Lee
(74) *Attorney, Agent, or Firm* — Garlick & Markison

(57) ABSTRACT

An electronic pen includes a pen tip, circuitry, and a shell. The shell houses the circuitry and is coupled to the pen tip. The pen tip includes a primary conductor, a secondary conductor and shielding between the primary conductor and the secondary conductor. The circuitry includes a transmit/receive circuit, a raw data circuit, and a secondary circuit. The transmit/receive circuit receives a signal from a touch screen via the primary conductor, generates a ring-back signal based on the signal, and transmits the ring-back signal via the primary conductor to the touch screen. The raw data circuit generates raw data regarding the electronic pen. The secondary circuit receives the raw data, up-converts the raw data into a data transmit signal, and transmits the data transmit signal via the secondary conductor to the touch screen.

16 Claims, 29 Drawing Sheets
(8 of 29 Drawing Sheet(s) Filed in Color)

Related U.S. Application Data

(60) Provisional application No. 62/910,182, filed on Oct. 3, 2019.

(56) References Cited

U.S. PATENT DOCUMENTS

| | | | |
|---|---|---|---|
| 6,218,972 | B1 | 4/2001 | Groshong |
| 6,665,013 | B1 | 12/2003 | Fossum et al. |
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,279,180 | B2 | 10/2012 | Hotelling et al. |
| 8,547,114 | B2 | 10/2013 | Kremin |
| 8,587,535 | B2 | 11/2013 | Oda et al. |
| 8,625,726 | B2 | 1/2014 | Kuan |
| 8,982,097 | B1 | 3/2015 | Kuzo et al. |
| 9,201,547 | B2 | 12/2015 | Elias |
| 2004/0246211 | A1* | 12/2004 | Perkins .................. B43K 29/00 345/79 |
| 2011/0063154 | A1 | 3/2011 | Hotelling et al. |
| 2011/0298745 | A1 | 12/2011 | Souchkov |
| 2012/0278031 | A1 | 11/2012 | Oda |
| 2013/0162604 | A1* | 6/2013 | Wang .................. G06F 3/03545 345/179 |
| 2013/0278447 | A1 | 10/2013 | Kremin |
| 2014/0327644 | A1 | 11/2014 | Mohindra |
| 2015/0091847 | A1 | 4/2015 | Chang |
| 2015/0205390 | A1* | 7/2015 | Yeh .................. G06F 3/041 345/179 |
| 2015/0346889 | A1 | 12/2015 | Chen |
| 2016/0188049 | A1 | 6/2016 | Yang et al. |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

\* cited by examiner computing device 10

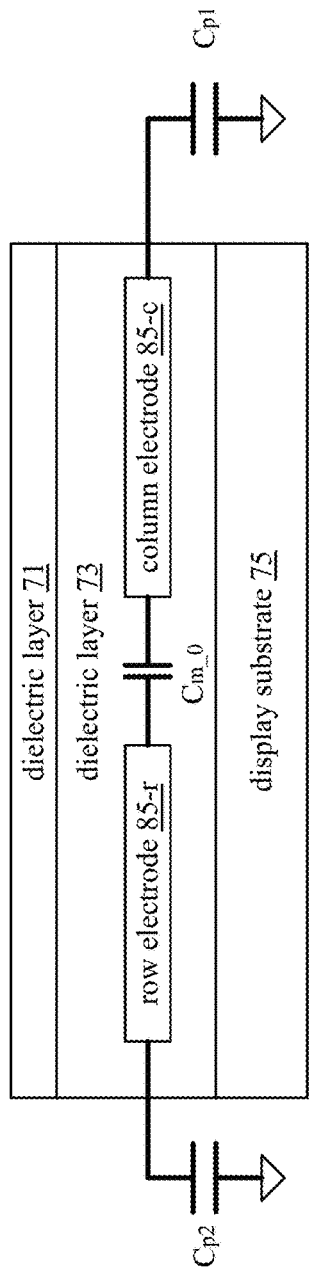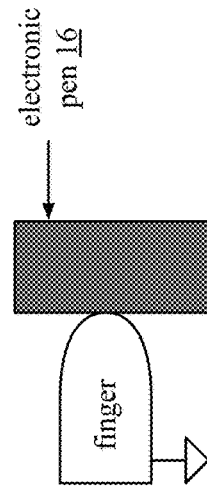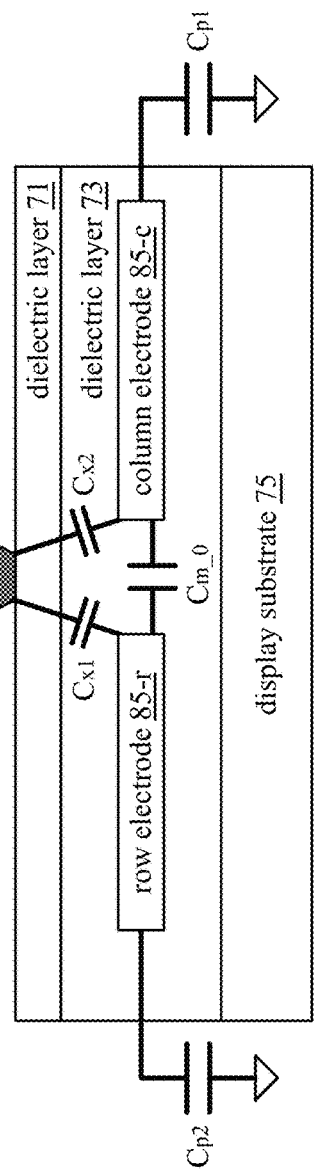
FIG. 4
no contact
FIG. 5
contact electronic pen 16 electronic pen 16 electronic pen 16 electronic pen 16 electronic pen 16

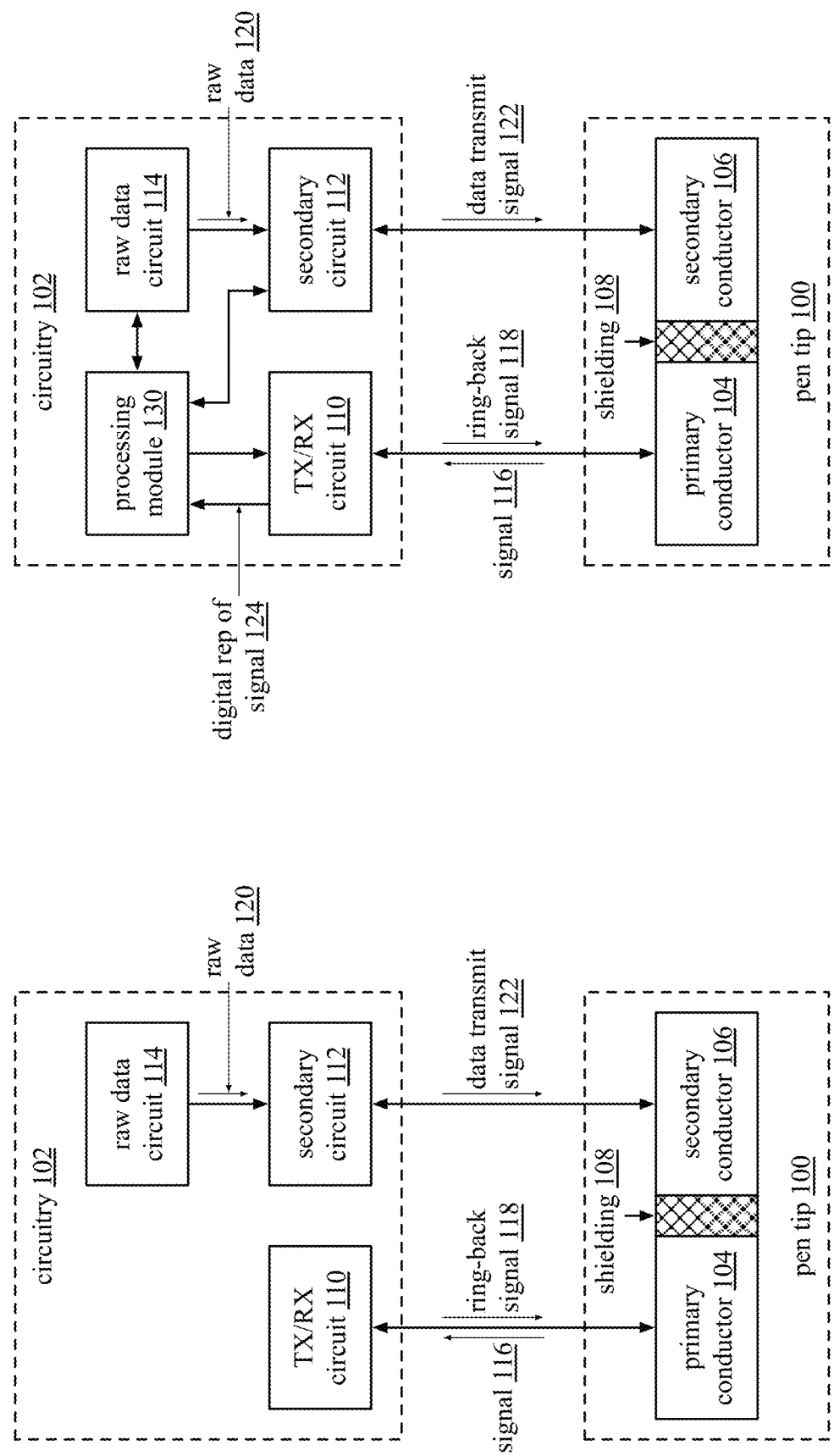

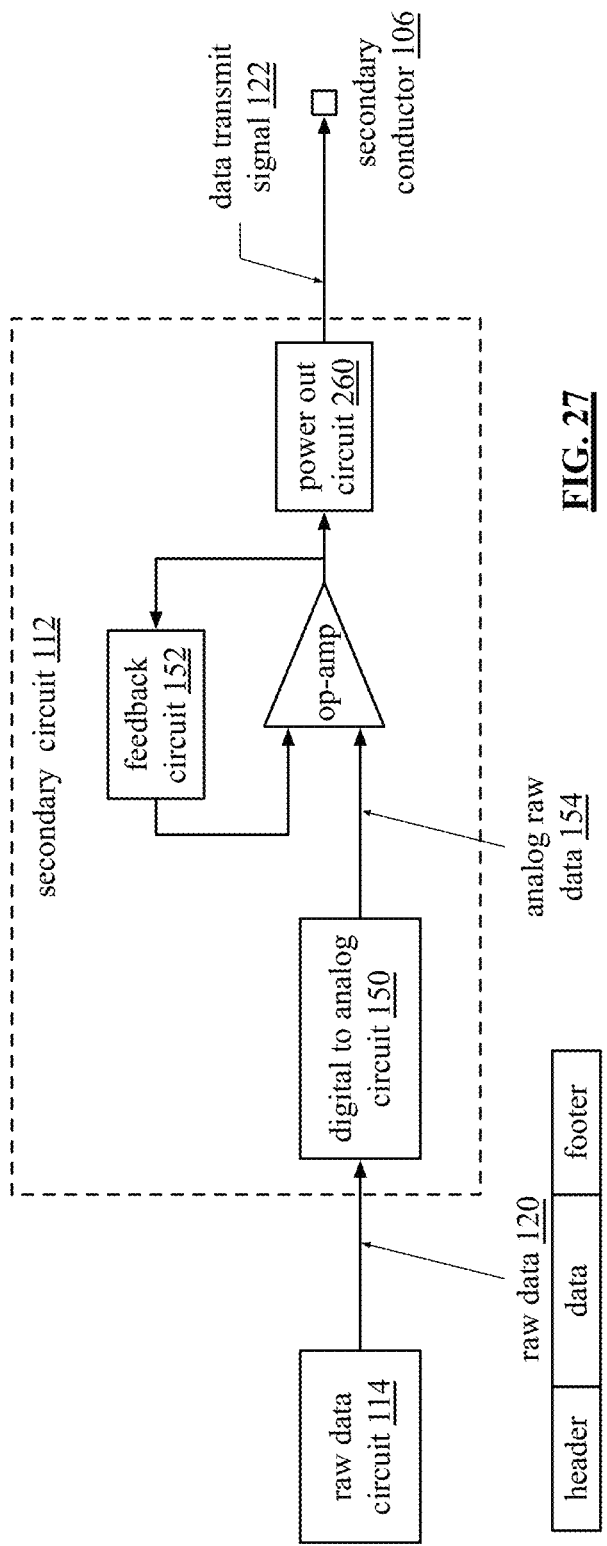
FIG. 27
FIG. 29
power output circuit 260
FIG. 28
op-amp & feedback

ELECTRONIC PEN WITH RING-BACK AND OTHER FUNCTIONALITIES

CROSS-REFERENCE TO RELATED APPLICATIONS

The present U.S. Utility patent application claims priority pursuant to 35 U.S.C. § 120, as a continuation-in-part of U.S. Utility patent application Ser. No. 16/445,420, entitled "PEN FOR USE WITH A TOUCH SCREEN," filed Jun. 19, 2019, pending, which claims priority pursuant to 35 U.S.C. § 120, as a continuation-in-part of U.S. Utility patent application Ser. No. 16/436,698, entitled "PEN FOR USE WITH A TOUCH SCREEN," filed Jun. 10, 2019, pending. The present U.S. Utility patent application also claims priority pursuant to 35 U.S.C. § 119(e) to U.S. Provisional Application No. 62/910,182, entitled "ELECTRONIC PEN WITH RING-BACK AND OTHER FUNCTIONALITIES", filed Oct. 3, 2019. All of these patent applications are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates to computer systems and more particularly to interaction with a touch screen of a computing device.

Description of Related Art

Computers include user interfaces to receive data from a user and to output data to a user. A common user interface is a graphical user interface (GUI) that provides images, or icons, for various types of data input (e.g., select a file, edit a word, type a character, draw a picture, look at a photo, format a document, etc.). In an example, the user selects an icon by manipulating a mouse to align a cursor with an icon and then "selects" the icon. In another example, the user selects an icon by touching the screen with the user's finger or with a special pen.

For general use of a pen with computers from different manufacturers and/or having different touch screen technologies, a pen includes a ring-back topology as described in patent application PCT/US2012/067897. The ring-back topology includes an inverting charge integrator and an inverting amplifier. When the tip of a ring-back pen touches the screen, the tip receives a signal from the screen. The inverting charge integrator integrates and inverts the received signal. The inverting amplifier inverts the integrated and inverted signal to produce an output signal that resembles the received signal. The pen sends the output signal back to the screen. The output signal affects the signal transmitted by the screen, which the screen interprets as a touch.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

FIG. 4 is a schematic block diagram of an example of capacitance of a touch screen with no touch in accordance with the present invention;

FIG. 5 is a schematic block diagram of an example of capacitance of a touch screen with a touch from a pen or a device in accordance with the present invention;

FIG. 14 is a schematic block diagram of an embodiment of an electronic pen in accordance with the present invention;

FIG. 15 is a schematic block diagram of another embodiment of an electronic pen in accordance with the present invention;

FIG. 27 is a schematic block diagram of an embodiment of a secondary circuit of an electronic pen in accordance with the present invention;

FIG. 28 is a schematic block diagram of an embodiment of an operational amplifier circuit of the secondary circuit in accordance with the present invention;

FIG. 29 is a schematic block diagram of an embodiment of a power output circuit of the secondary circuit in accordance with the present invention;

DETAILED DESCRIPTION OF THE INVENTION

Figure 1:
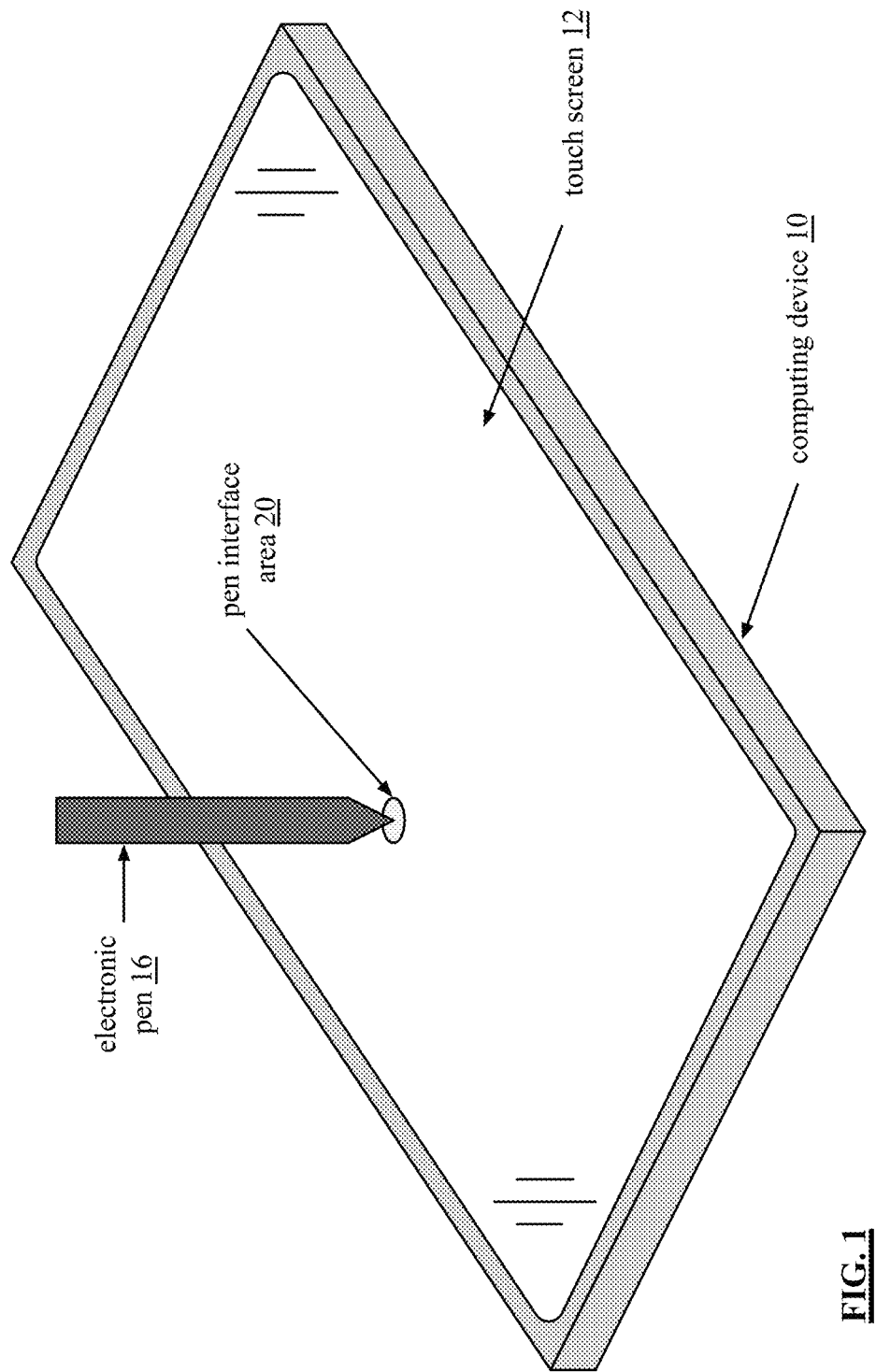
FIG. 1 is a schematic block diagram of an embodiment of a communication device with a pen and/or an input device in accordance with the present invention.

FIG. 1 is a schematic block diagram of an embodiment of a computing device 10 having a touch screen 12, which may further include a display to form a touch screen display. The computing device 10, which will be discussed in greater detail with reference to one or more of FIGS. 2-3, may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core.

A fixed computing device may be a computer (PC), an interactive white board, an interactive table top, an interactive desktop, an interactive display, a computer server, a cable set-top box, vending machine, an Automated Teller Machine (ATM), an automobile, a satellite receiver, a television set, a printer, a fax machine, home entertainment equipment, a video game console, and/or any type of home or office computing equipment. An interactive display functions to provide users with an interactive experience (e.g., touch the screen to obtain information, be entertained, etc.). For example, a store provides interactive displays for customers to find certain products, to obtain coupons, to enter contests, etc.

An electronic pen 16 interacts with the touch screen 12 to communication data with the computing device 10. For example, the pen 16 touches, or nearly touches, the touch screen at a pen interaction area 20. Within the pen interaction area 20, the touch screen 12 transmits a signal, or multiple signals, which are received by the pen 16. In a ring back mode, the pen 16 mimics the signal it receives and sends it back to the touch screen 12. In a more advanced and novel mode, the pen 16 includes data with the ring back signal to provide additional information to the touch screen. For example, the data includes pen orientation data (e.g., angles of the pen in two or more axis), pressure data (e.g., how hard the user is pressing the pen on the screen), pen functionality (e.g., fine tip, coarse tip, clean line, fuzzy line, etc.), pen mode (e.g., draw, write, erase), pen features (e.g., color, button presses, etc.), pen data (e.g., battery life, user information, feature set, capabilities, etc.), etc.

In another advanced and novel mode, the touch screen 12 provides additional data to the pen 16. For example, the signal, or signals, transmitted by the touch screen include embedded data. The embedded data for the pen 16 includes a variety of information. For example, the embedded data for the pen includes feedback for fine tuning the interaction between the pen and the touch screen (e.g., frequency selection, power control, etc.). In another example, the embedded data for the pen includes authentication data to ensure that user of the pen on the computing device is authorized to do so.

While the example of FIG. 1 shows one pen 16 interacting with the touch screen 12, multiple pens and/or fingers may simultaneously interact with the touch screen 12. For example, while pen 16 is interacting with the touch screen, a finger touches the touch screen 12 in a different area to convey different information to the computing device 10. As another example, a second pen interacts with the touch screen 12 while pen 16 is interacting with the touch screen.

Figure 2:
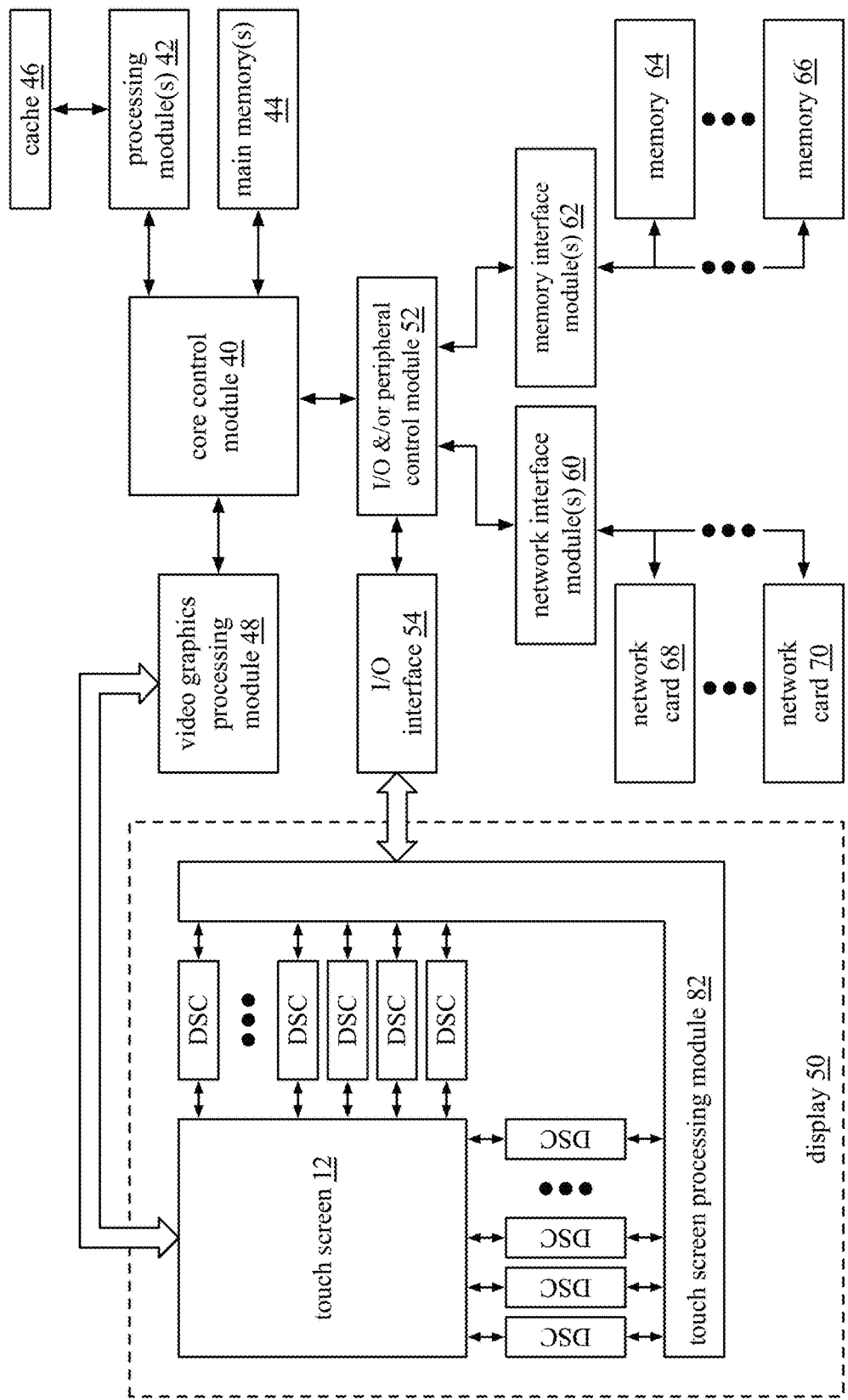
FIG. 2 is a schematic block diagram of an embodiment of a computing device in accordance with the present invention.

FIG. 2 is a schematic block diagram of an embodiment of a computing device 10 that includes a core control module 40, one or more processing modules 42, one or more main memories 44, cache memory 46, a video graphics processing module 48, a display 50, an Input-Output (I/O) peripheral control module 52, one or more input interface modules, one or more output interface modules, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 (4$^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and a network, or networks, via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) via the input interface module(s) and the I/O and/or peripheral control module 52. An input device includes a keypad, a keyboard, control switches, a touchpad, a microphone, a camera, etc. An input interface module includes a software driver and a hardware connector for coupling an input device to the I/O and/or peripheral control module 52. In an embodiment, an input interface module is in accordance with one or more Universal Serial Bus (USB) protocols.

The core control module 40 coordinates data communications between the processing module(s) 42 and output device(s) via the output interface module(s) and the I/O and/or peripheral control module 52. An output device includes a speaker, etc. An output interface module includes a software driver and a hardware connector for coupling an output device to the I/O and/or peripheral control module 52. In an embodiment, an output interface module is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

The display 50 includes the touch screen 12, a plurality of drive-sense circuits (DSC), and a touch screen processing module 82. The touch screen 12 includes a plurality of sensors (e.g., electrodes, capacitor sensing cells, capacitor sensors, inductive sensor, etc.) to detect a proximal touch of the screen. For example, when a pen touches the screen, capacitance of sensors proximal to the touch(es) are affected (e.g., impedance changes). As another example, when a pen touches the screen, a sensor's signal is changed (e.g., magnitude increase, magnitude decrease, phase shift, etc.). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 3:
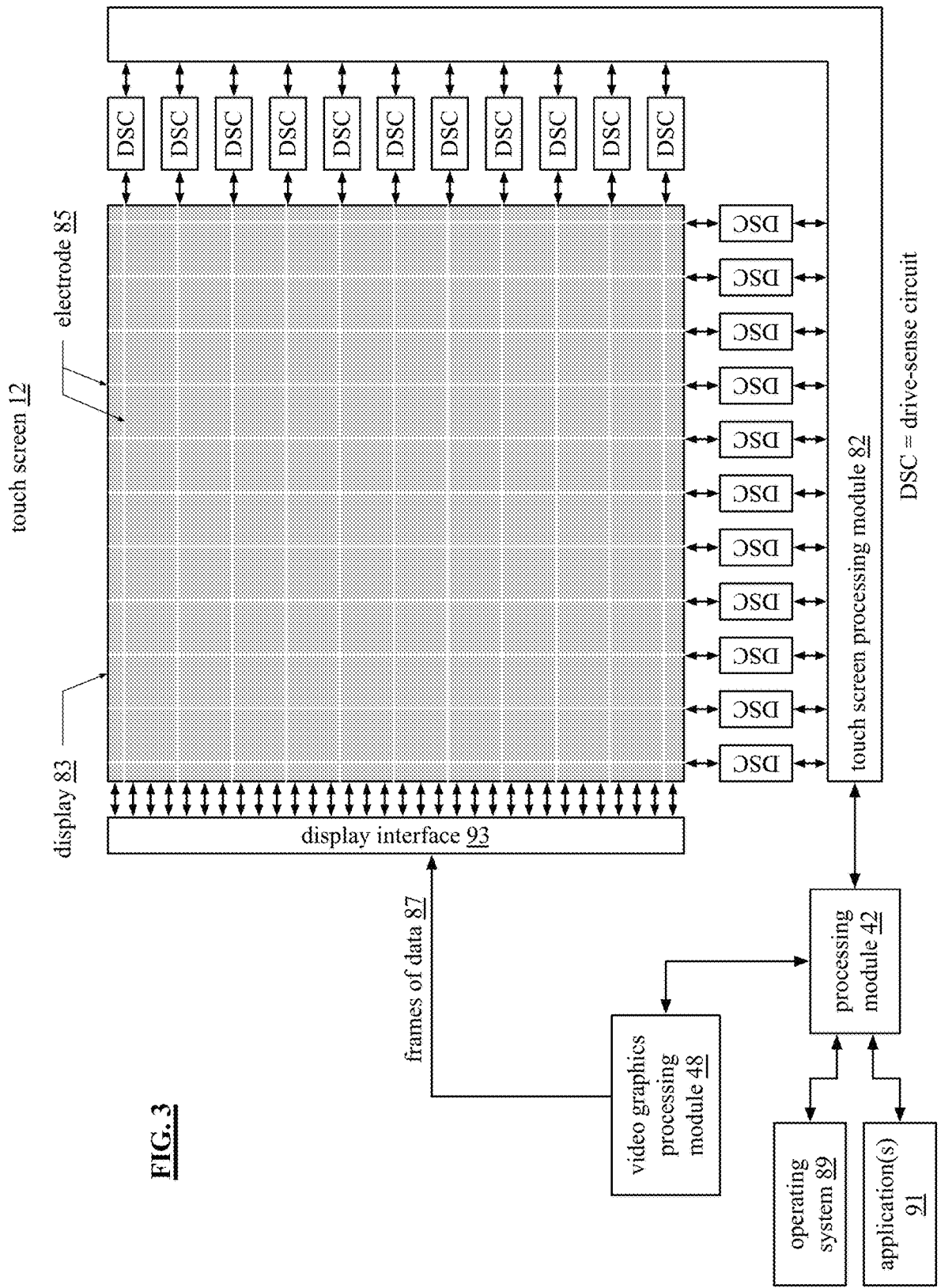
FIG. 3 is a schematic block diagram of another embodiment of a computing device in accordance with the present invention.

FIG. 3 is a schematic block diagram of another embodiment of a computing device 10 that includes the touch screen 12, the drive-sense circuits (DSC), the touch screen processing module 82, a display 83, electrodes 85, the processing module 42, the video graphics processing module 48, and a display interface. The display 83 may be a large screen display (e.g., for portable computing devices) or a large screen display (e.g., for fixed computing devices). In general, a large screen display has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it's not an exhaustive list.

| Resolution | Width (lines) | Height (lines) | pixel aspect ratio | screen aspect ratio | screen size (inches) |
| --- | --- | --- | --- | --- | --- |
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |

-continued

| Resolution | Width (lines) | Height (lines) | pixel aspect ratio | screen aspect ratio | screen size (inches) |
|---|---|---|---|---|---|
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 |

The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The touch screen 12 includes electrodes 85 that provide the sensors for the touch sense part of the touch screen display. The electrodes 85 are distributed throughout the display area or where touch screen functionality is desired. For example, a first group of the electrodes are arranged in rows and a second group of electrodes are arranged in columns.

The electrodes 85 are comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, an electrode is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example of operation, the processing module 42 is executing an operating system application 89 and one or more user applications 91. The user applications 91 includes, but is not limited to, a video playback application, a spreadsheet application, a word processing application, a computer aided drawing application, a photo display application, an image processing application, a database application, etc. While executing an application 91, the processing module generates data for display (e.g., video data, image data, text data, etc.). The processing module 42 sends the data to the video graphics processing module 48, which converts the data into frames of video 87.

The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

While the display 83 is rendering the frames of video into visible images, the drive-sense circuits (DSC) provide sensor signals to the electrodes 85. When the screen is touched by a pen or device, signals on the electrodes 85 proximal to the touch (i.e., directly or close by) are changed. The DSCs detect the change for effected electrodes and provide the detected change to the touch screen processing module 82.

The touch screen processing module 82 processes the change of the effected electrodes to determine one or more specific locations of touch and provides this information to the processing module 42. Processing module 42 processes the one or more specific locations of touch to determine if an operation of the application is to be altered. For example, the touch is indicative of a pause command, a fast forward command, a reverse command, an increase volume command, a decrease volume command, a stop command, a select command, a delete command, etc.

If the signals received from the pen or device include embedded data, the touch screen processing module 82 interprets the embedded data and provides the resulting information to the processing module 42. If, computing device 10 is not equipped to process embedded data, the pen or device still communicates with the computing device using ring-back, i.e., change the signals on the electrodes by increasing magnitude, decreasing magnitude, producing a phase shift, or other change to the signals.

FIG. 4 is a cross section schematic block diagram of an example of capacitance of a touch screen 12 with no touch of a pen or a device. The electrode 85s are positioned proximal to dielectric layer 73, which is between cover dielectric layer 71 and the display substrate 75. Each electrode 85 has a self-capacitance, which corresponds to a parasitic capacitance created by the electrode with respect to other conductors in the display (e.g., ground, conductive layer(s), and/or one or more other electrodes). For example, row electrode 85-r has a parasitic capacitance $C_{p2}$ and column electrode 85-c has a parasitic capacitance $C_{p1}$. Note that each electrode includes a resistance component and, as such, produces a distributed R-C circuit. The longer the electrode, the greater the impedance of the distributed R-C circuit. For simplicity of illustration the distributed R-C circuit of an electrode will be represented as a single parasitic capacitance.

As shown, the touch screen 12 includes a plurality of layers 71-75. Each illustrated layer may itself include one or more layers. For example, dielectric layer 71 includes a surface protective film, a glass protective film, and/or one or more pressure sensitive adhesive (PSA) layers. As another example, the second dielectric layer 73 includes a glass cover, a polyester (PET) film, a support plate (glass or plastic) to support, or embed, one or more of the electrodes 85-*c* and 85-*r*, a base plate (glass, plastic, or PET), an ITO layer, and one or more PSA layers. As yet another example, the display substrate 75 includes one or more LCD layers, a back-light layer, one or more reflector layers, one or more polarizing layers, and/or one or more PSA layers.

A mutual capacitance ($C_{m\_0}$) exists between a row electrode and a column electrode. When no touch is present, the self-capacitances and mutual capacitances of the touch screen 12 are at a nominal state. Depending on the length, width, and thickness of the electrodes, separation from the electrodes and other conductive surfaces, and dielectric properties of the layers, the self-capacitances and mutual capacitances can range from a few pico-Farads to 10's of nano-Farads.

FIG. 5 is a schematic block diagram of an example of capacitance of a touch screen with a touch from a pen 16. The pen 16 is capacitive coupled to the row and column electrodes proximal to the touch. When the pen 16 is touch by a person and is touching the touch screen, the person provides a path to ground such that the pen affects both the mutual capacitance and the self-capacitance. When the pen is not touched by a person, there is no path to ground and thus the pen or device only effects the mutual capacitance.

In addition, the pen 16 receives signals from the touch screen via the capacitance coupling to the screen. The signals transmitted by the pen to the touch screen are also through the capacitance coupling and affect the signals on the electrodes 85.

As an example, the device 14 is capacitively coupled to the touch screen of the computing device via capacitor Cx1 and/or capacitor Cx2. For example, the pen 16 is coupled to the touch screen via capacitor Cx1 or capacitor Cx2. For a pen 16 touch, the capacitance of Cx1 or Cx2 is about 50 femto-Farads. Depending on the area of the contact surface of the device, the capacitance of Cx1 and/or Cx2 will be in the range of 50 femto-Farads to 10 or more pico-Farads.

Due to the small capacitance of Cx1 and/or Cx2, the pen 16 generates an effective negative capacitance to enable the drive sense circuits (DSC) to detect the presence of the pen. In an embodiment, the effective negative capacitance is about −50 femto-Farads.

Figure 6:
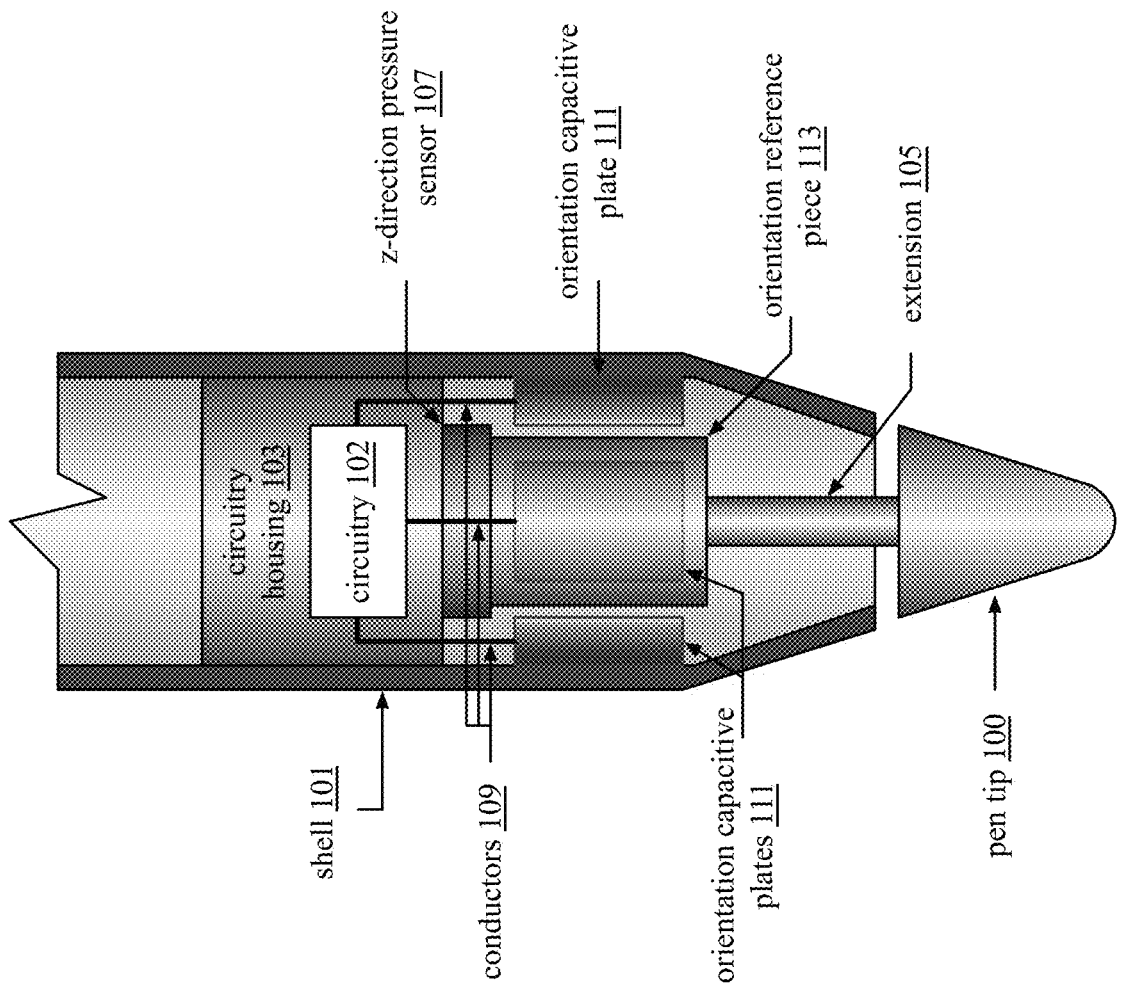
FIG. 6 is a schematic block diagram of an embodiment of an electronic pen in accordance with the present invention.

FIG. 6 is a schematic block diagram of an embodiment of an electronic pen 16 that includes a pen tip 100 and a shell 101. The shell 101 is a hollow tube (e.g., circular, square, triangle, etc. cross section) having a length and diameter of a conventional pen. The shell 101 further includes a tapered end towards the pen tip 100. The shell 101 includes a circuitry housing 103 in which circuitry 102 resides. The pen tip 105 is coupled to an extension piece 105, which mates with an orientation reference piece 113 or other mating piece within the shell 111.

The circuitry 102 includes one or more circuit boards and conductors 109, which are connected to a z-direction pressure sensor 107 and orientation capacitive plates 111. The orientation capacitive plates 111 are mechanically coupled to the shell 111 and form orientation capacitors with one or more capacitive plates within the orientation reference piece 113. The use of the orientation capacitors will be discussed with reference to one or more subsequent figures.

When the pen tip 100 is in contact with a touch screen, the z-direction pressure sensor 107 measures an amount of pressure. In an embodiment, the z-direction pressure sensor 107 is a capacitive diaphragm that, when compressed, changes capacitance. The change in capacitance corresponds to an amount of pressure. The change in capacitance is provided to the circuitry 102, which includes the change in capacitance in a signal that is transmitted to the touch screen via the pen tip 100.

Figure 7:
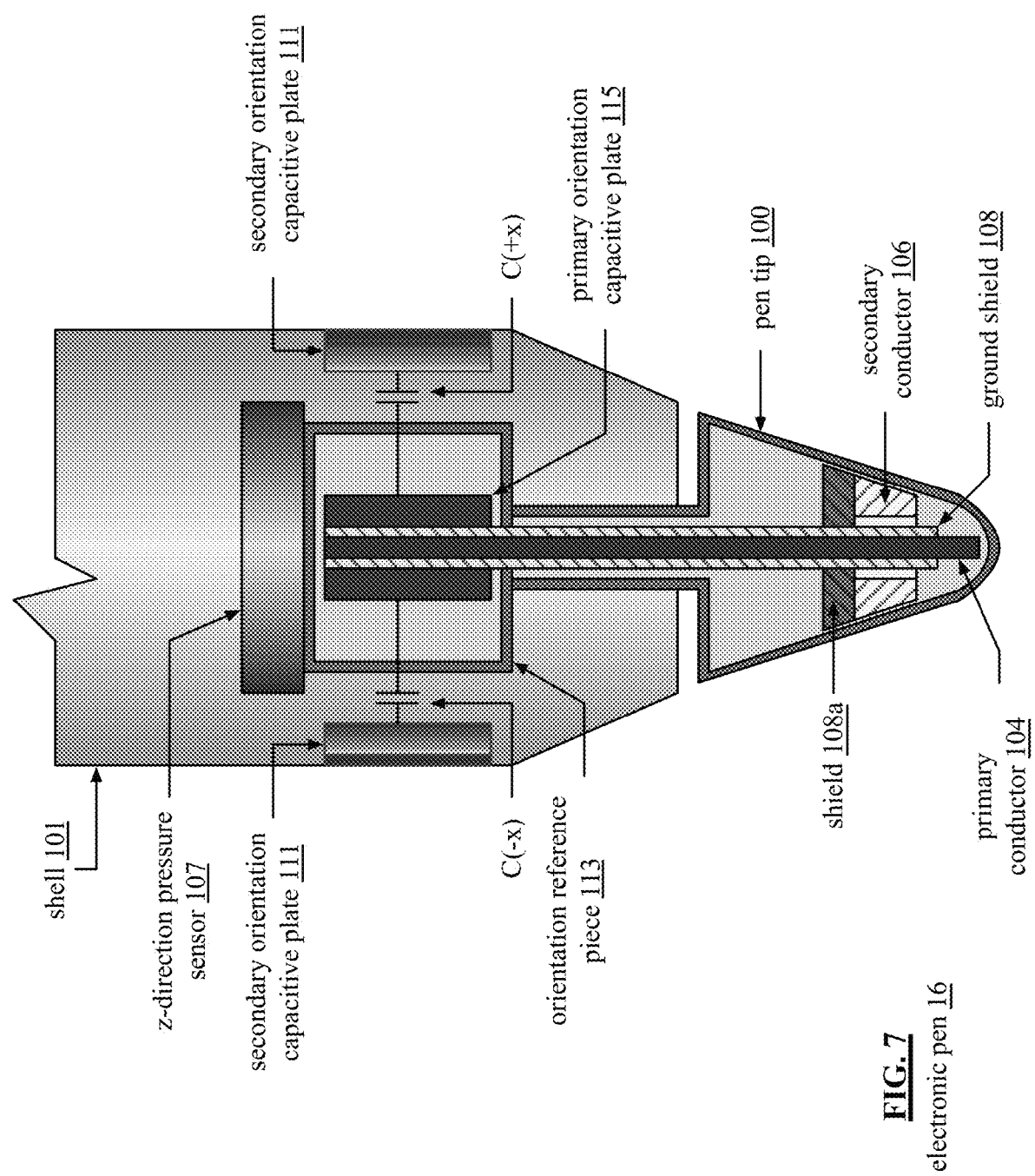
FIG. 7 is a cross section diagram of another embodiment of an electronic pen in accordance with the present invention.

FIG. 7 is a cross section diagram of another embodiment of an electronic pen 16 that includes the pen tip 100, the shell 101, secondary orientation plates 111, the z-direction pressure sensor 107, the orientation reference piece 113, and one or more primary orientation capacitive plates 115 (which is within the orientation reference piece 113). The secondary orientation plates 111 and the one or more primary orientation capacitive plates 115 form orientation capacitors. In this example, orientation capacitors C−x and C+x, which are shown, and C−y and C+y, which are not shown since they are perpendicular in this figure. The electronic pen 16 would include at least one more orientation capacitor to create tilt orientation data (e.g., tilt of the pen).

A primary conductor 104, a secondary conductor 106, a ground shield 108, and a shield 108*a* are mounted within the pen tip 100. The primary conductor 104 functions to receive a signal from the touch screen 12 and to transmit a ring-back signal, which will be discussed with reference to one or more subsequent figures. The secondary conductor 106 transmits and/or receives other signals to and/or from the touch screen, which will be discussed with reference to one or more subsequent figures. The shielding 108 and 108*a*, which may be active or passive, provide electrical isolation between the primary conductor 104 and the secondary conductor 106, which helps to reduce and/or eliminate a ring-back blob (e.g., the image rendered on the touch screen is misaligned from the primary conductor due to capacitive coupling between the primary conductor and a conductive pen tip or conductive shell).

In an embodiment, the primary conductor 104 has a diameter of about 1 mm$^2$ and the glass thickness of the touch screen is about 2 mm (millimeter), which produces a primary to electrode capacitance of about 0.02 pF (pico-Farads). With these parameters, the electrodes of the touch screen are driven with a 3 Vpp signal to provide an adequate signal to the primary conductor of the pen.

The secondary conductor 106 is separated from the primary conductor 104 by about 1 mm and is isolated from the primary conductor 104 by the shielding 108. This provides less than 0.002 pF of capacitance between the primary and secondary conductors. As such, there is little to no coupling between the conductors and, if present, occurs at the edge of the tip and closest edge of the secondary.

Figure 8:
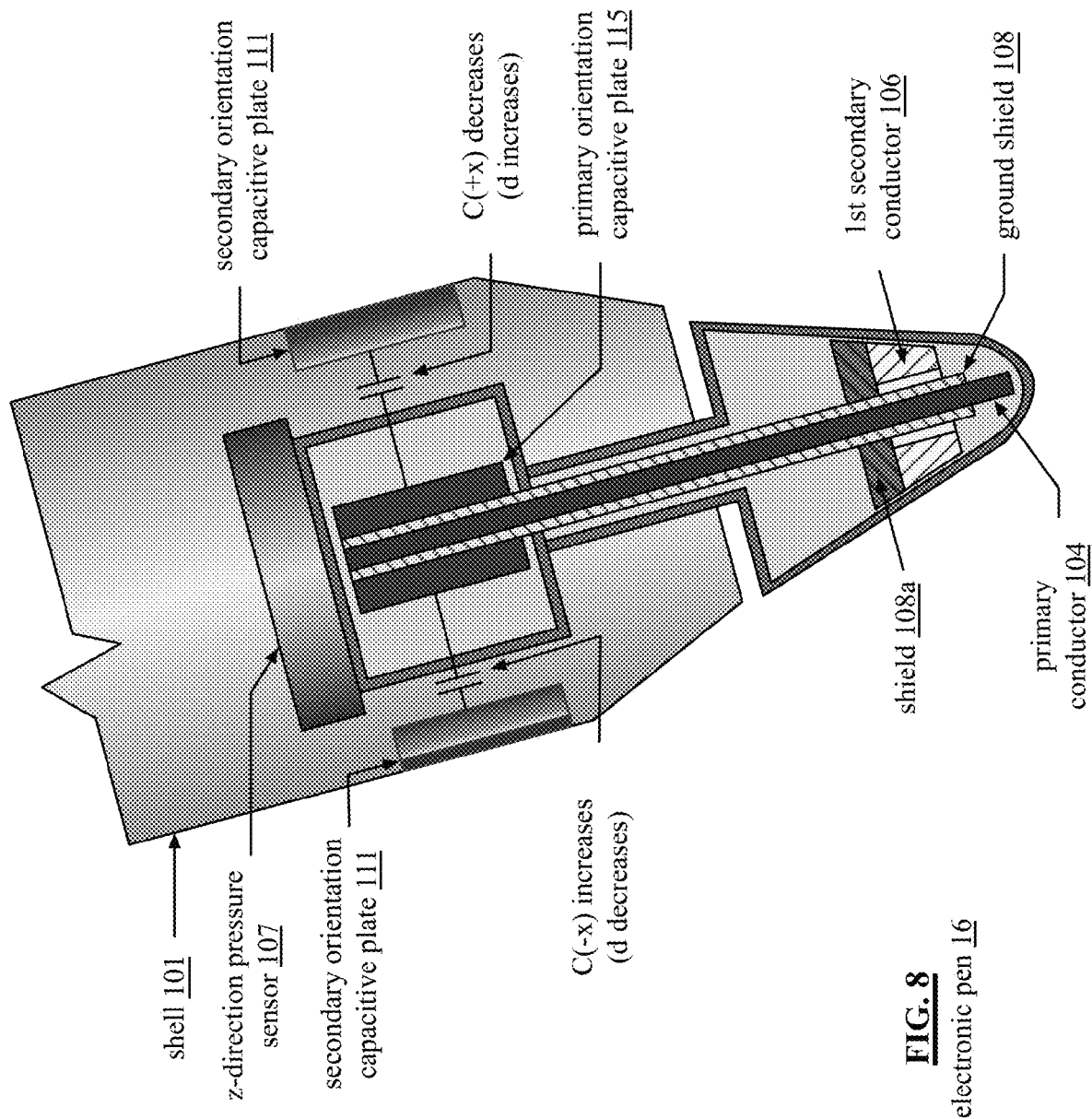
FIG. 8 is a cross section diagram of another embodiment of an electronic pen in accordance with the present invention.

FIG. 8 is a cross section diagram of another embodiment of an electronic pen 16 that is similar to FIG. 7, but tilted. With a tilt in the direction shown, the primary orientation capacitive plate 115 shifts within the shell 101. This shift decreases the gap between the primary orientation capacitive plate 115 with one of the secondary orientation capacitive plates 111, which increases the capacitance of orientation capacitor (C−x). The shift also increases the gap between the primary orientation capacitive plate 115 with one of the secondary orientation capacitive plates 111, which decreases the capacitance of orientation capacitor (C+x). Note that:

$$C = \varepsilon \frac{A}{a}, \text{ where}$$

$C$ = capacitance, $\varepsilon$ = is permitivity of dielectric,

A is the area of the plates, and d is the distance between the plates.

A similar change occurs with the other orientation capacitors. The capacitance values of the orientation capacitors ($C_{-x}$, $C_{+x}$, $C_{-y}$, and $C_{+y}$) and/or their change in capacitance is transmitted to the touch screen via the secondary conductor 106. This will be discussed in greater detail with reference to one or more subsequent figures.

Figure 9:
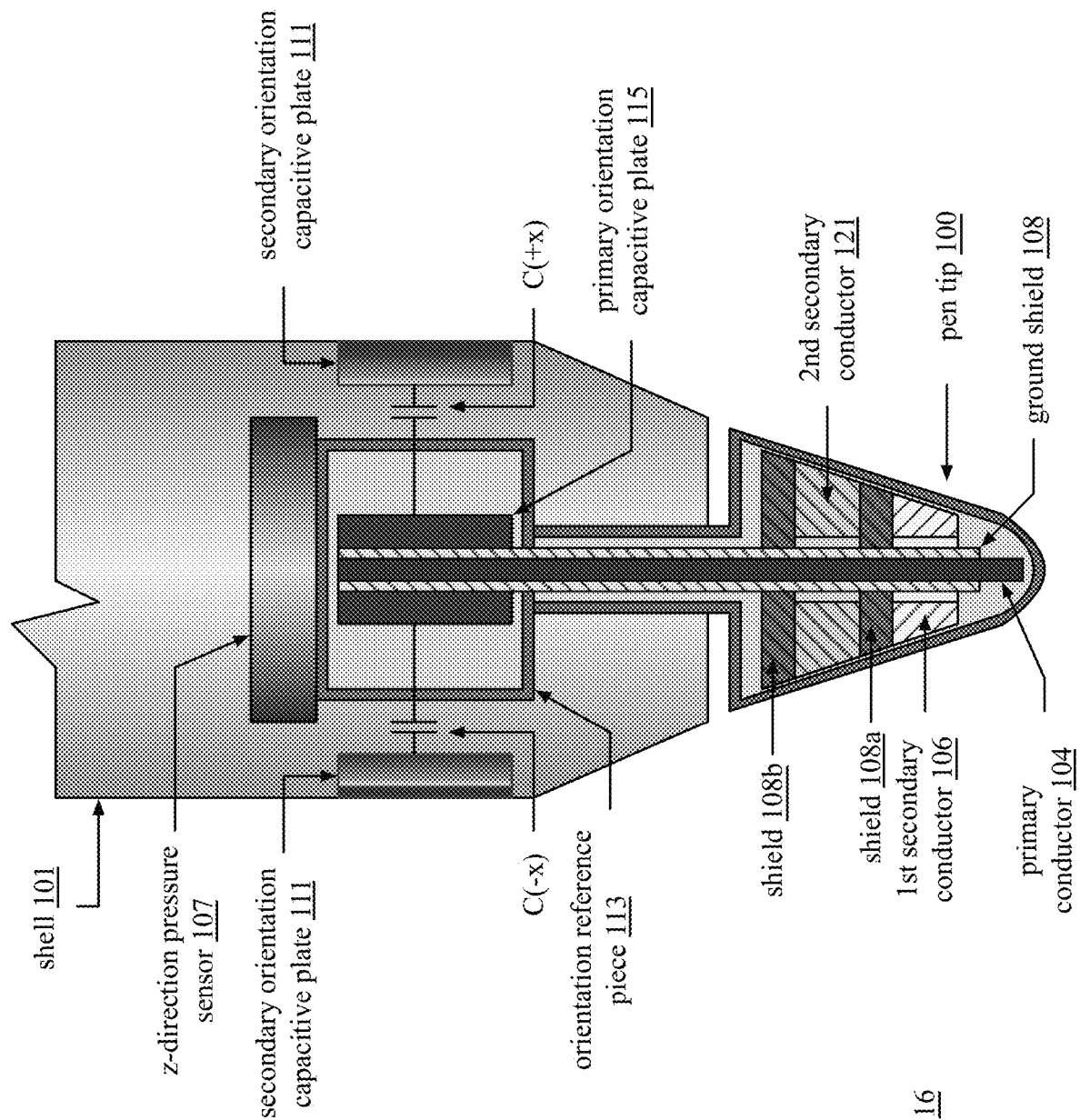
FIG. 9 is a cross section diagram of another embodiment of an electronic pen in accordance with the present invention.

FIG. 9 is a cross section diagram of another embodiment of an electronic pen 16 that is similar to FIG. 7 with an exception being that the pen tip 100 further includes a second secondary conductor 121 and another layer of shielding 108b. With a second secondary conductor 121, additional information can be transmitted to and/or received from the touch screen.

Figure 10:
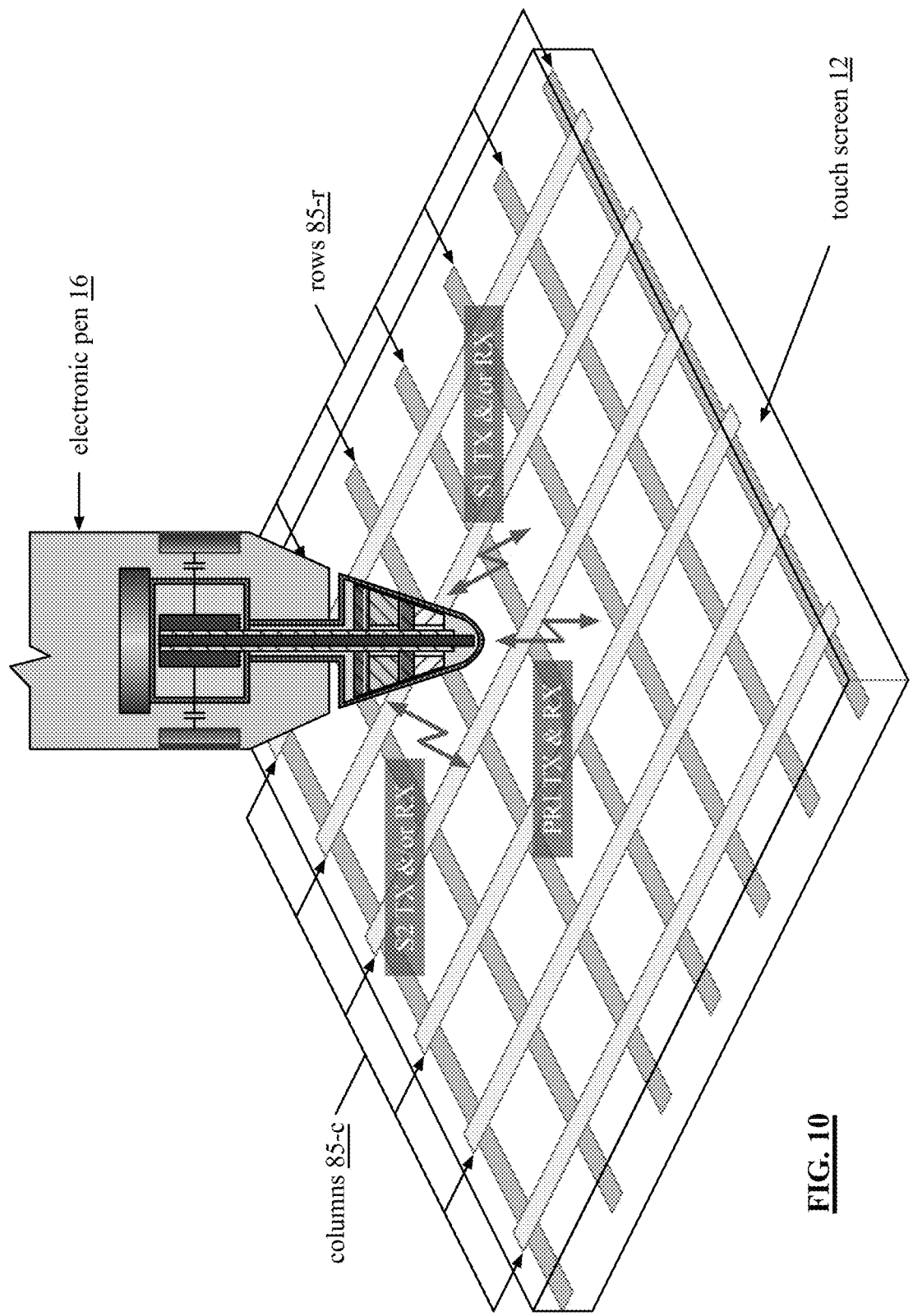
FIG. 10 is a schematic block diagram of an example of an electronic pen interfacing with a touch screen in accordance with the present invention.

FIG. 10 is a schematic block diagram of an example of an electronic pen 16 interfacing with a touch screen 12. The touch screen is shown to include a plurality of column electrodes 85-c and a plurality of row electrodes 85-r in, or on, one or more layers of the touch screen. The pen tip of the pen 16 includes the primary conductor, the $1^{st}$ secondary conductor, and the $2^{nd}$ secondary conductor.

In an example, the computing device transmits a self-signal (e.g., a sinusoidal signal at a first frequency) on at least some of the rows and columns of electrodes 85-c and 85-r. The self-signal allows the touch screen processing module 82 (FIGS. 2 and 3) to determine self-capacitance of the electrodes. An increase is self-capacitance of an electrode is indicative of a touch by the pen 16 being held by a person (e.g., the person provides a path to ground).

To increase the self-capacitance of an electrode, the pen 16 receives the self-signal of the electrode (e.g., PRI TX signal) via the primary inductor. The pen 16, via the circuitry, inverts and scales the self-signal to produce a ring-back signal. The pen 16, via the primary conductor, transmits the ring-back signal (e.g., PRI RX signal) to the touch screen. The ring-back signal effectively causes an increase in self-capacitance of the electrode, which is indicative of a touch.

In another example, the pen 16 transmits pen orientation information (e.g., S1 TX signal) via the $1^{st}$ secondary conductor. For example, x & y data from the orientation capacitors and z data from the z-direction pressure sensor. The pen orientation data is sent in a raw format (e.g., as raw data of capacitor values, change in capacitor values, a pressure value, etc.). The touch screen processing module 82 processes the raw data (e.g., pen orientation data) to determine tilt of the pen and pressure being applied to the touch screen. This information is further processed by the touch screen processing module 82 to produce a desire effect of pen usage. The touch screen processing module 82 can also transmit a signal (e.g., S1 RX) to the $1^{st}$ secondary conductor.

In yet another example, the pen 16 transmits pen functional data (e.g., S1 TX signal) via the $2^{nd}$ secondary conductor. For example, pen functional data includes one or more of color, erase, thickness, battery information, etc. The pen functional data is sent in a raw format (e.g., as analog signals, digital values, button presses, switch openings and closings, etc.). The touch screen processing module 82 processes the raw pen functional data to determine a desired function of the pen. This information is further processed by the touch screen processing module 82 to produce a desire effect of pen usage. The touch screen processing module 82 can also transmit a signal (e.g., S2 RX) to the $2^{nd}$ secondary conductor.

Figure 11:
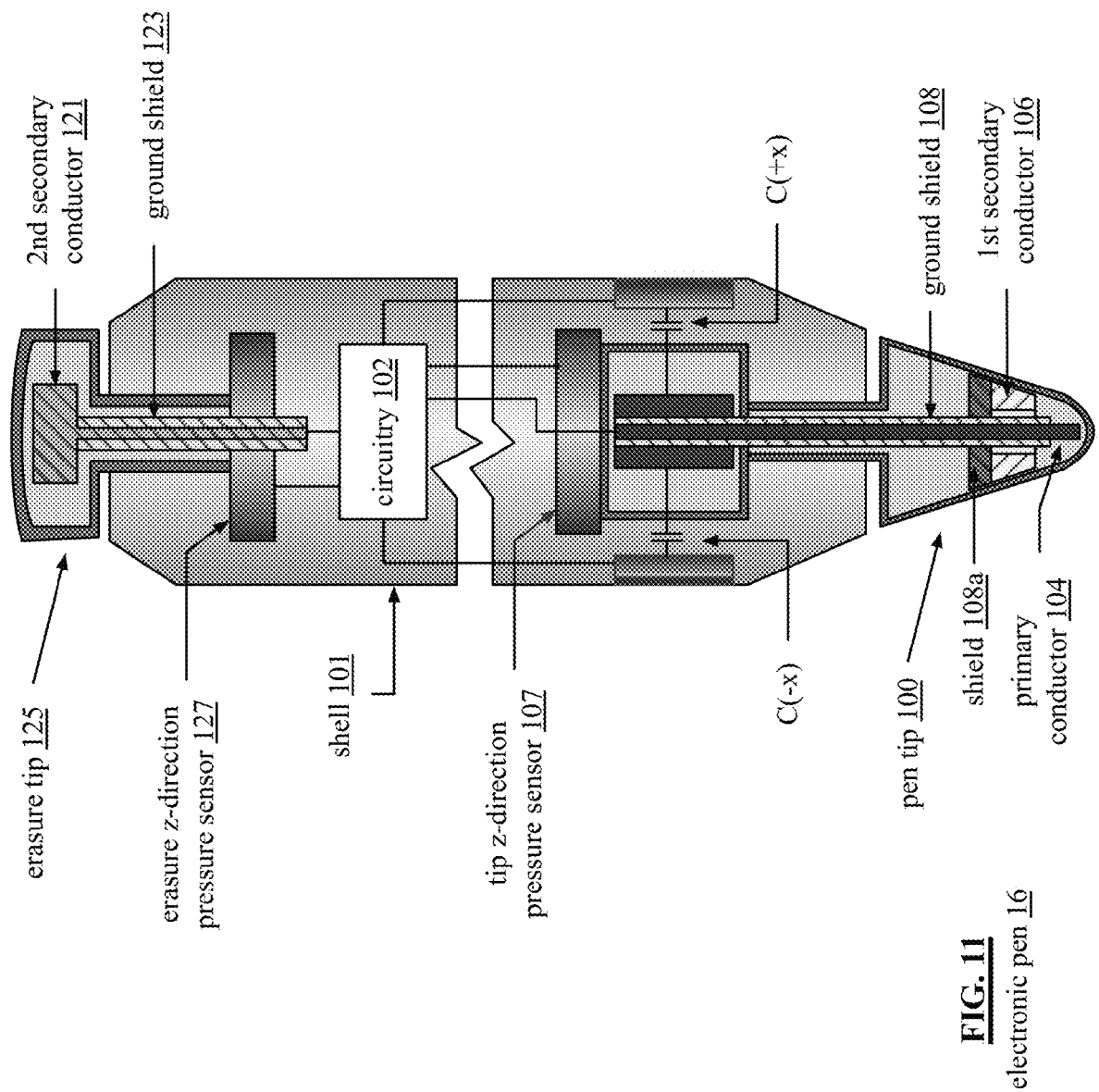
FIG. 11 is a cross section diagram of another embodiment of an electronic pen in accordance with the present invention.

FIG. 11 is a cross section diagram of another embodiment of an electronic pen 16 that includes the pen tip 100, the shell 101, and an erasure tip 125. The pen tip 100 includes the primary conductor 104, the $1^{st}$ secondary conductor 106, and the shielding 108 and 108a. The erasure tip 125 includes the $2^{nd}$ secondary conductor 121 and a ground shield 123. The shell 101 is mechanically coupled to the pen tip 100 and the erasure tip 125. The shell 101 also houses the circuitry 102, the orientation capacitors ($C_{-x}$, $C_{+x}$, $C_{-y}$, $C_{+y}$), a pen tip z-direction pressure sensor 107, and an erasure z-direction pressure sensor 127. The pen tip 100 and the orientation capacitors operate similarly to the pen of FIG. 7.

In this embodiment, the pen 16 includes an electronic erasure. The electronic erasure includes the erasure tip 125 (which is of a shape to resemble an erasure), the $2^{nd}$ secondary conductor 121, the ground shield 123, and a portion of the circuitry 102. In addition, the electronic erasure may further include the erasure z-direction pressure sensor 127 to provide an indication of pressure applied between the erasure tip 125 and the touch screen. Still further, the circuitry 102 may include an accelerometer and/or gyroscope to determine when the pen tip 100 or the erasure tip 125 is towards the touch screen. When the pen tip is towards the touch screen, the functionality of the erasure can be deactivated to save power. Similarly, when the erasure tip is towards the touch screen, pen functionality can be deactivated to save power.

When the electronic erasure is being used, the circuitry 102 generates an electronic erasure signal (e.g., a sinusoidal signal having a unique frequency). The circuitry 102 provides the electronic erasure signal to the $2^{nd}$ secondary conductor, which is the conduit to transmit the electronic erasure signal to the touch screen. The touch screen processing module 82 (FIGS. 2 and 3) processes the electronic erasure signal to erase data in an area corresponding to the touch of the $2^{nd}$ secondary conductor with the touch screen. Note that a touch includes physical contact and in close proximity for signals to be transmitting and received.

When the electronic erasure includes the erasure z-direction pressure sensor 127, the erasure z-direction pressure sensor 127 sends raw pressure data (e.g., a capacitance value, a change in capacitance value, a pressure value, etc.) to the circuitry 102. The circuitry 102 modulates the raw pressure data with the electronic erasure signal to produce a modulates erasure signal. The circuitry 102 sends the modulated erasure signal to the $2^{nd}$ secondary conductor transmits, which is the conduit to send the signal to the touch screen. The touch screen processing module 82 (FIGS. 2 and 3) processes the modulated erasure signal to erase data in an area corresponding to the touch and pressure of the $2^{nd}$ secondary conductor with the touch screen.

Figure 12:
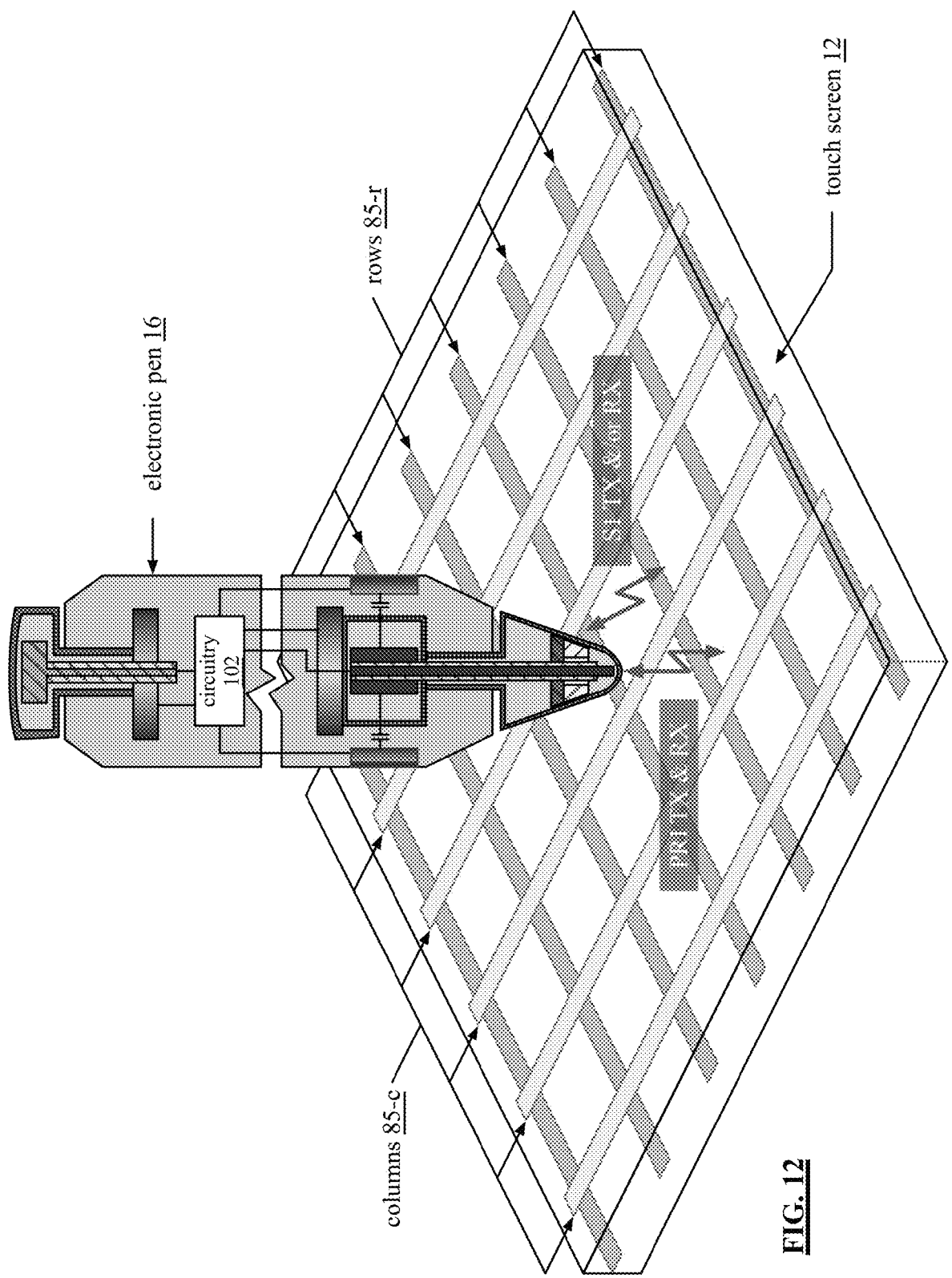
FIG. 12 is a schematic block diagram of another example of an electronic pen interfacing with a touch screen in accordance with the present invention.

FIG. 12 is a schematic block diagram of another example of the pen tip of an electronic pen 16 interfacing with a touch screen 12. The touch screen is shown to include a plurality of column electrodes 85-c and a plurality of row electrodes 85-r in, or on, one or more layers of the touch screen. The pen tip of the pen 16 includes the primary conductor and the $1^{st}$ secondary conductor; the erasure tip includes the $2^{nd}$ secondary conductor.

In an example of the pen tip interfacing with the touch screen, the computing device transmits a self-signal to the primary conductor as described with reference to FIG. 10. The circuitry 102 of the pen processes the self-signal to produce the ring-back signal. The pen 16, via the primary conductor, transmits the ring-back signal to the touch screen as described with reference to FIG. 10. With respect to the $1^{st}$ secondary conductor, the pen 16 transmits pen orientation information and/or pen functional data as described with reference to FIG. 10.

Figure 13:
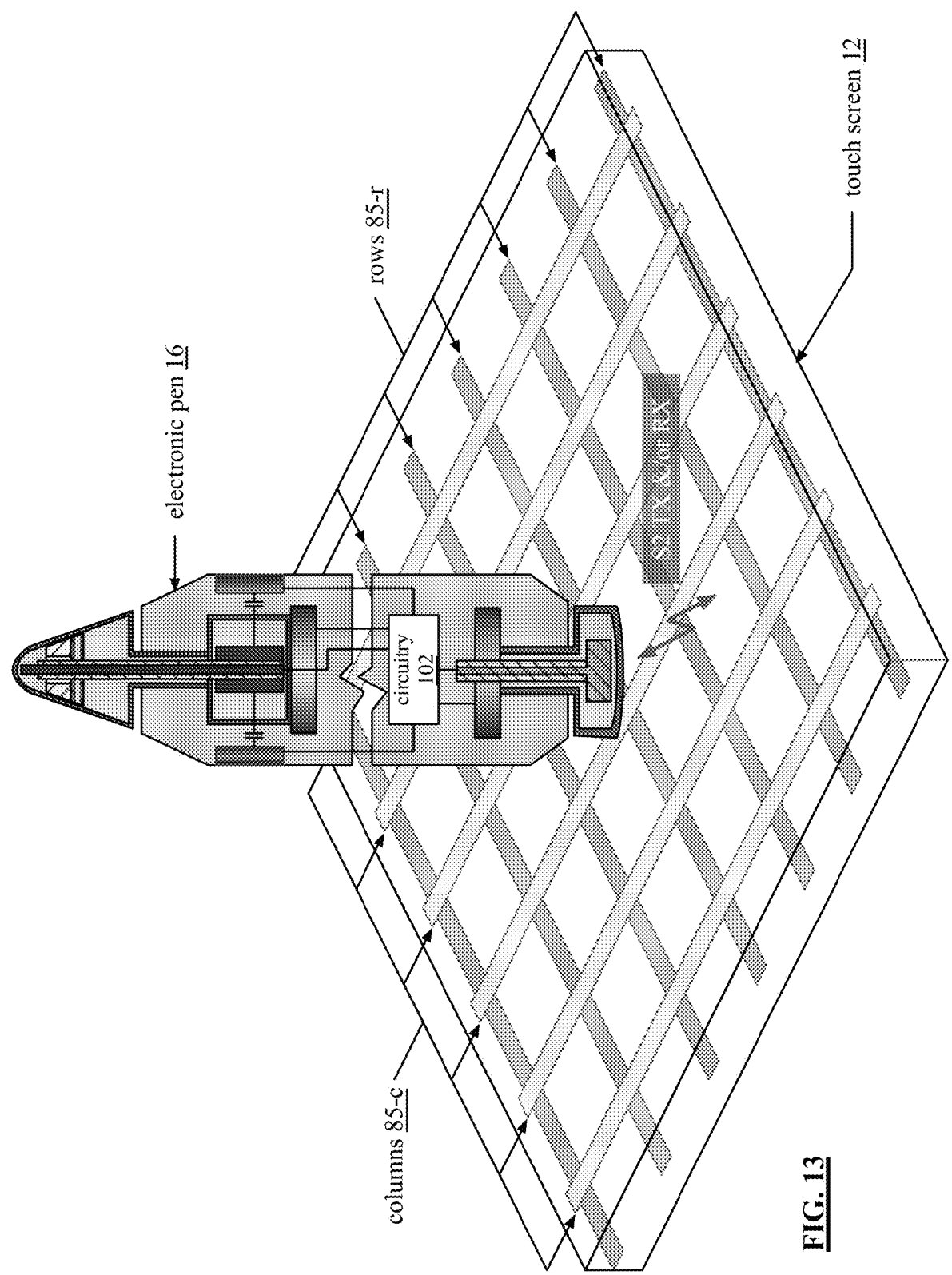
FIG. 13 is a schematic block diagram of another example of an electronic pen interfacing with a touch screen in accordance with the present invention.

FIG. 13 is a schematic block diagram of another example of the erasure tip of an electronic pen 16 interfacing with a touch screen 12. The touch screen is shown to include a plurality of column electrodes 85-c and a plurality of row electrodes 85-r in, or on, one or more layers of the touch screen. The pen tip of the pen 16 includes the primary conductor and the $1^{st}$ secondary conductor; the erasure tip includes the $2^{nd}$ secondary conductor.

In an example of the erasure tip interfacing with the touch screen, the circuitry 102 generates a signal as discussed with reference to FIG. 11. The signal is transmitted via the $2^{nd}$ secondary conductor to the touch screen, which is processed by the touch screen processing module 82 as also discussed with reference to FIG. 11.

FIG. 14 is a schematic block diagram of an embodiment of an electronic pen 16 that includes the pen tip 100, the shell 101 (not shown in this figure), and circuitry 102. The circuitry 102 includes a transmit/receive (TX/RX) circuit 110, a secondary circuit 112, and a raw data circuit 114. Depending on the capabilities of the touch screen processing module 82 (FIGS. 2 and 3), the electronic pen 16 can function in a ring-back only mode (e.g., the TX/RX circuit is active and the others are inactive) such that the pen functions as a touch device. In another mode that is novel, the TX/RX circuit, the raw data circuit, and the secondary circuit are active. In this mode, additional data regarding the pen's operation (e.g., pen's orientation with respect to the touch screen, power information, pen functions, etc.) can be conveyed between the pen 16 and the touch screen processing module.

In the ring-back mode, which may be the default start up mode, the TX/RX circuit 110 receives a signal 116 from the touch screen via the primary conductor 104. The TX/RX circuit 110 generate a ring-back signal 118 based on the signal 116. The TX/RX circuit 110 then transmits the ring-back signal 118 via the primary conductor 104 to the touch screen. Various embodiments of the TX/RX circuit 110 are discussed with reference to FIGS. 16 and 17.

The raw data circuit 114 may be implemented in a variety of ways to produce a variety of raw data. For example, the raw data circuit 114 is an orientation circuit that generates raw orientation data (e.g., capacitance values or changes in capacitance values that represent x-y tilt of the pen). As another example, the raw data circuit 114 is a pressure sensor that generates raw pressure data (e.g., a capacitance value, a change in capacitance value, an analog signal, etc.). As yet another example, the raw data circuit 114 is a pen function circuit that generates raw pen function data (e.g., pen color, pen thickness, power information (e.g., battery life, power consumption, battery charging, etc.), etc.). In general, raw data 120, whether in analog and/or digital form, requires further processing for it to have meaning for the pen and/or the computing device. To reduce power consumption of the pen, the processing of the raw data into meaningful data is done by the touch screen processing module 81 and/or the processing module 42 of the computing device 10 (FIGS. 1-3).

The secondary circuit 112 receive the raw data 120 from the raw data circuit 114 and up-converts it into a data transmit signal 122. For example, the secondary circuit 112 up-converts the raw data 120 by modulating it with a reference oscillation (e.g., a sinusoidal signal having a unique frequency). As another example, the secondary circuit 112 up-converts the raw data 120 by increasing the power of the raw data (e.g., amplifying voltage and/or current of the raw data). The secondary circuit 112 then transmits the data transmit signal 122 to the touch screen via the secondary conductor 106.

FIG. 15 is a schematic block diagram of another embodiment of an electronic pen 16 that includes the pen tip 100, the shell 101 (not shown in this figure), and circuitry 102. The circuitry 102 includes the transmit/receive (TX/RX) circuit 110, the secondary circuit 112, the raw data circuit 114, and a processing module 130. In this embodiment, the processing module 130 provides the pen 16 with more functional options.

As an example, the processing module 130 receives a digital representation 124 of the inversion of the signal 116. As will be discussed in greater detail with reference to FIGS. 16 and/or 17, the TX/RX circuit 110 generates the ring-back signal 118 as a scaled and inverted version of the signal 116. The TX/RX circuit 110 converts the scaled and inverted version of the signal 118, which is an analog signal, into a digital signal (i.e., the digital representation 124 of the inversion of the signal 116).

In this example, a data message is embedded in the signal 116 by the touch screen processing module. The data message may be regarding a variety of matters. For example, the data message is a command requesting data (e.g., send orientation raw data, send z-direction raw data, send power data, etc.). As another example, the data message is regarding pen operation (e.g., turn on/off erasure, turn on/off secondary circuit, etc.).

The processing module 130 extracts the data message from the digital representation 124 of the inversion of the signal 116 and processing it. Depending on the nature of the data message, the processing module 130 generates a message response (e.g., a response to a request for data) or generates a pen command (e.g., turn on the erasure).

Figure 16:
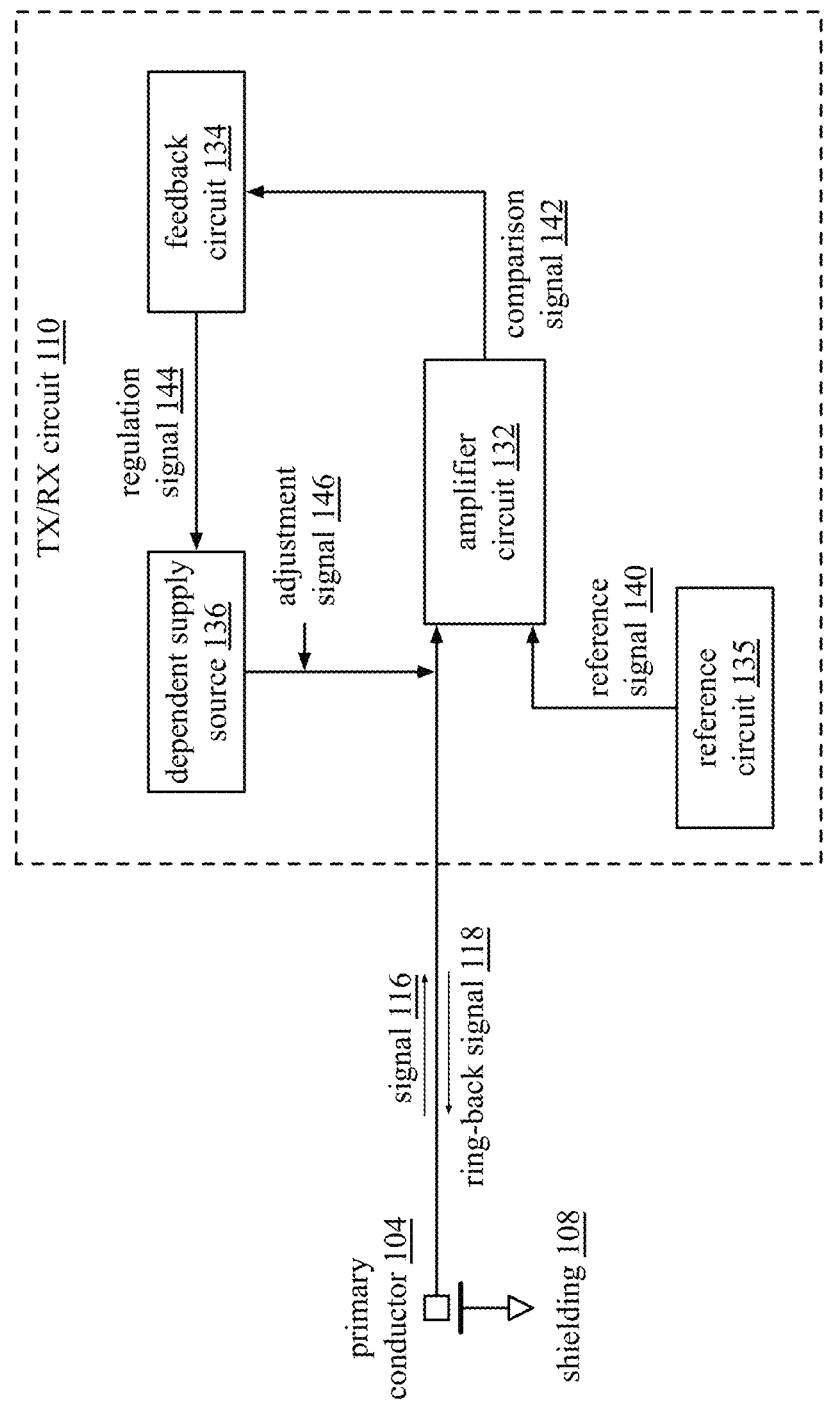
FIG. 16 is a schematic block diagram of an embodiment of a transmit-receive circuit of an electronic pen in accordance with the present invention.

FIG. 16 is a schematic block diagram of an embodiment of a transmit-receive (TX/RX) circuit 110 that includes an amplifier circuit 132, a feedback circuit 134, a dependent supply source 136, and a reference circuit 135. The amplifier circuit 132 may be implemented in a variety of ways. For example, the amplifier circuit 132 is an inverting amplifier. As another example, the amplifier circuit 132 is a non-inverting amplifier followed by an inverter.

In an example, an input of the amplifier circuit 132 receives the signal 116 (e.g., a signal from the touch screen) via the primary conductor 104. Another input of the amplifier circuit 132 receives a reference signal 140, which is generated by the reference circuit 135. In an embodiment, the reference signal 140 is a DC signal at a common mode voltage level. For example, if the amplifier circuit 132 has rail voltages of Vdd and Vss, then the common mode voltage is about half way between Vdd and Vss. As a specific example, when Vdd is 1 Volt and a Vss is −1 Volt, then the common mode voltage is 0 Volts. In this specific example, the signal 116 is effectively grounded to the pen 16.

From the input signals (e.g., signal 116 and the reference signal 140), the amplifier circuit 132 generates a comparison signal 142. The comparison signal 142 is effectively a scaled and inverted (or non-inverted) version of the signal 116. The scaling of the inverted (or non-inverted) signal is based on the feedback circuit 134 and the dependent supply source 136 (e.g., a dependent current source and/or a dependent voltage source). In particular, the feedback circuit 134 (which may include a short, one or more resistors, and/or one or more capacitors to establish a gain and frequency response for the amplifier circuit 132) generates a regulation signal 144 based on the comparison signal 142.

The dependent supply source 136 converts the regulation signal 144 into an adjustment signal 146. The dependent supply source 136 supplies the adjustment signal to the primary conductor 104 to produce the ring-back signal 118, which can be in the range of 100 mVp-p to 1 Vp-p or more.

Figure 17:
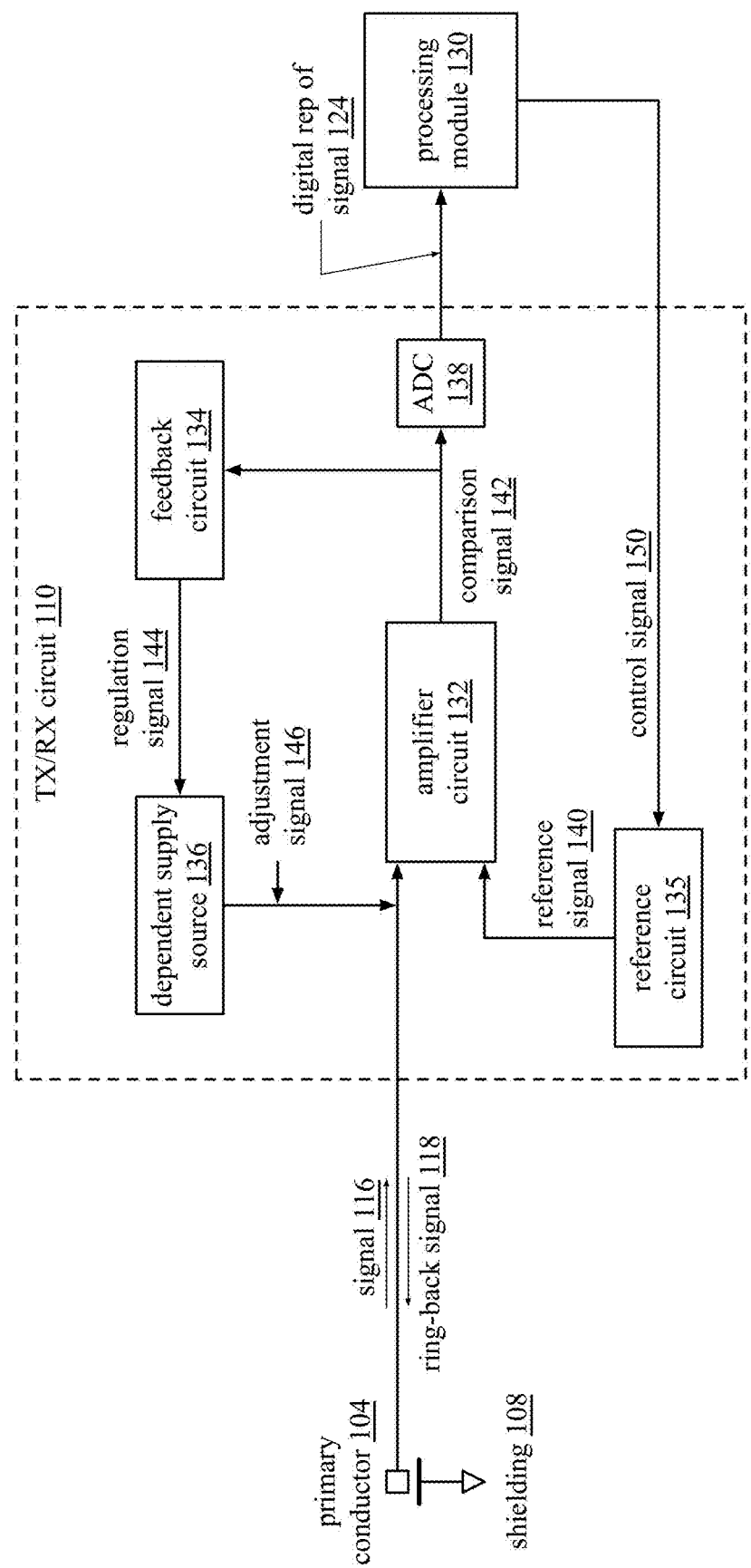
FIG. 17 is a schematic block diagram of another embodiment of a transmit-receive circuit of an electronic pen in accordance with the present invention.

FIG. 17 is a schematic block diagram of another embodiment of a transmit-receive (TX/RX) circuit 110 coupled to the processing module 130. The TX/RX circuit 110 includes the amplifier circuit 132, the feedback circuit 134, the dependent supply source 136, and the reference circuit 135 as discussed with reference to FIG. 16. The TX/RX circuit 110 further includes an analog to digital converter (ADC) 138, which converts the comparison signal 142 into the digital representation 124 of the signal 116.

As discussed with reference to FIG. 15, the signal 116 may include an embedded data message. The processing module 130 extracts the data message from the signal in a variety of ways. For example, the processing module 130 demodulates the signal 116 to extract the data message. As another example, the processing module 130 filters (e.g., low pass, band pass, or high pass) the signal 116 to extract the data message.

Figure 19:
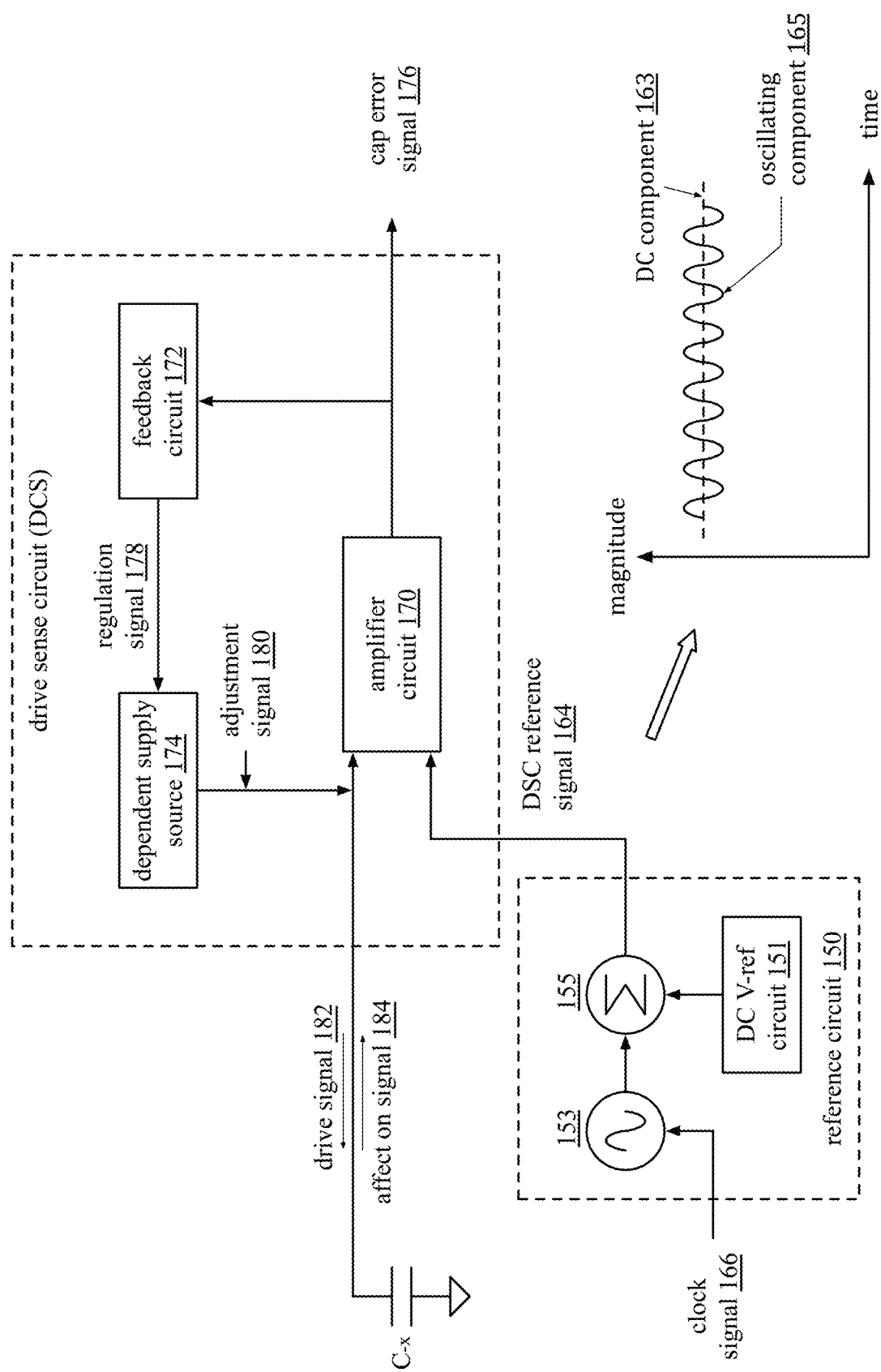
FIG. 19 is a schematic block diagram of an embodiment of a reference circuit and a drive sense circuit (DSC) of a raw data circuit in accordance with the present invention.

The processing module 130 is further operation to generate a control signal 150, which it provides to the reference circuit 135. In an example, the control signal 150 is a setting for the reference circuit 135 to set the reference signal 140 to a specific DC level (e.g., common mode voltage, a voltage above common mode, a voltage below common mode). In another example, the control signal 150 is a setting for the reference circuit 135 to generate the reference signal 140 to include an DC component and an AC component (an example is shown in FIG. 19).

As yet another example, the control signal 150 includes a message response created by the processing module 130. The reference circuit 135 includes the message response in the reference signal 140 such that the message response is included in the ring-back signal 118. For a more detailed discussion of communicating data via a structure similar to the TX/RX circuit see co-pending patent application entitled, "LOW VOLTAGE DRIVE CIRCUIT WITH BUS ISOLATION AND METHODS FOR USE THEREWITH", having a serial number of Ser. No. 16/246,772, and a filing date of Jan. 14, 2019, now U.S. Pat. No. 10,684,977.

Figure 18:
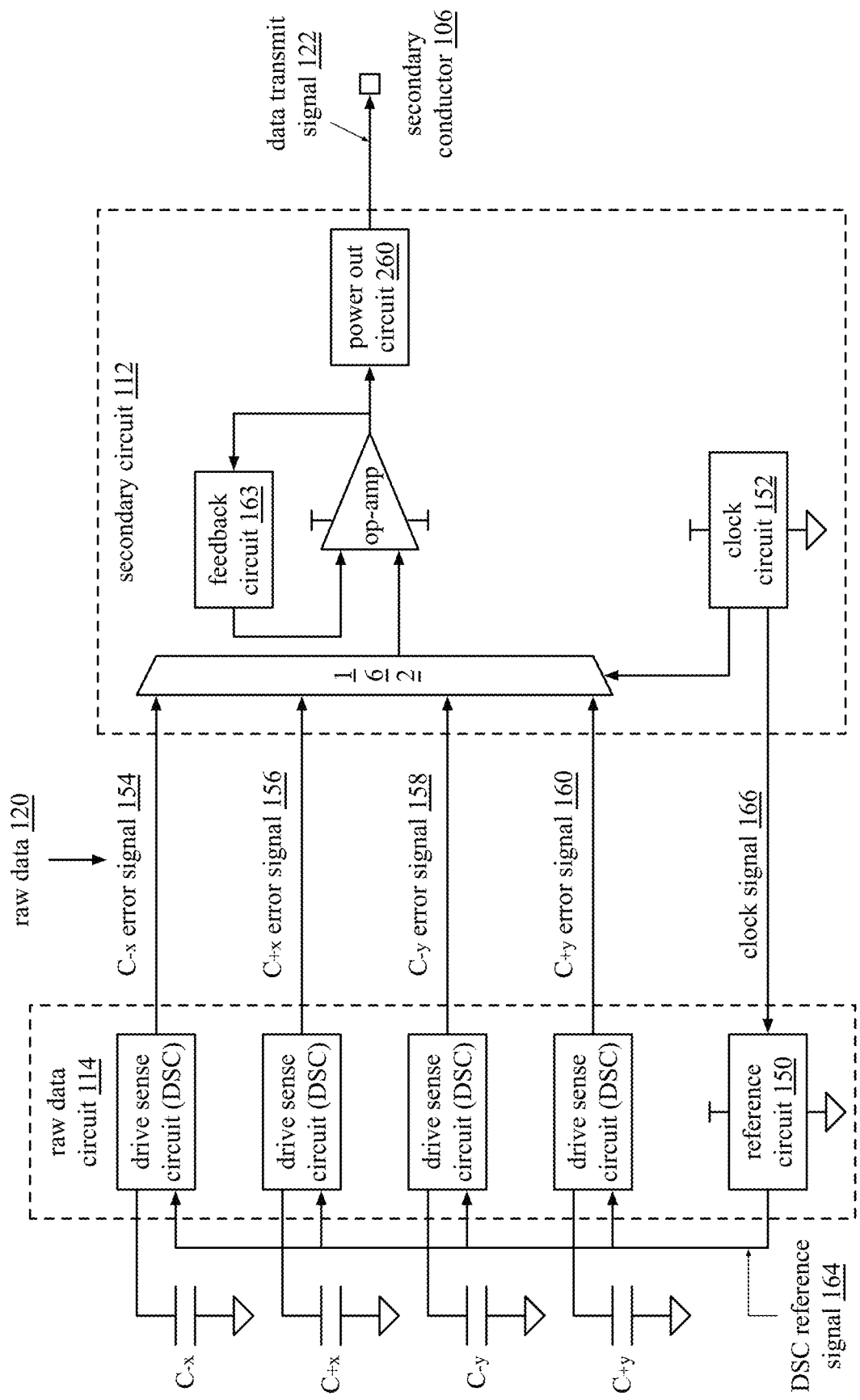
FIGS. 18 and 18A are schematic block diagrams of an embodiment of a raw data circuit and a secondary circuit of an electronic pen in accordance with the present invention.
Figure 18A:
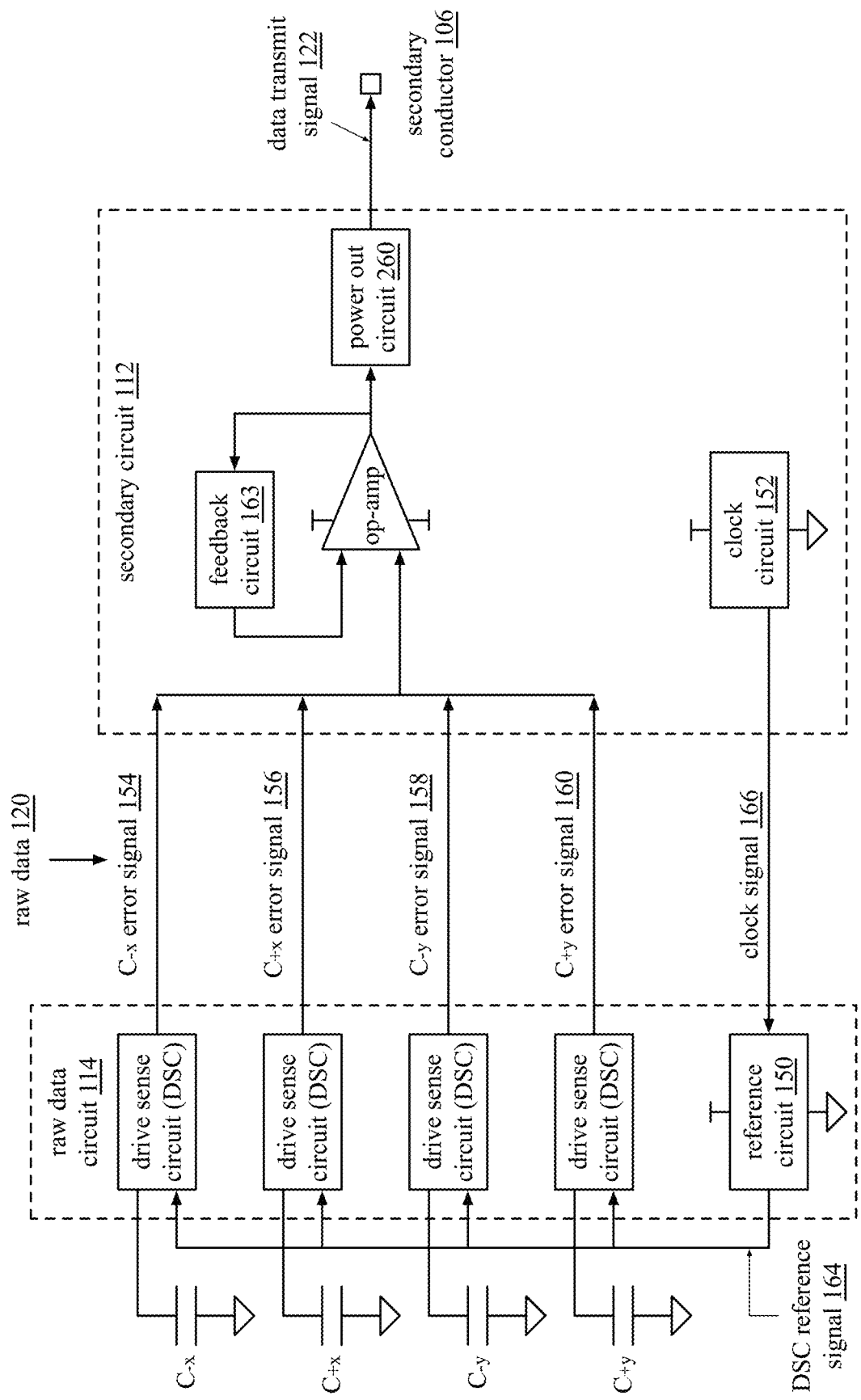

FIGS. 18 and 18A are schematic block diagrams of an embodiment of a raw data circuit 114 and a secondary circuit 112 of an electronic pen 16. The raw data circuit 114 includes a plurality of drive sense circuits (DSC) and a reference circuit 150; examples of each are discussed with reference to FIG. 19. The drive sense circuit are coupled to a plurality of orientation capacitors ($C_{-x}$, $C_{+x}$, $C_{-y}$, and $C_{+y}$). While four DSCs and four orientation capacitors are shown, there could be more or less than four of each.

The secondary circuit 112 includes a multiplexer 162, a clock circuit 152, an operational amplifier (op-amp), a feedback circuit 163, and a power output circuit 260. An example of a power output circuit 260 is discussed with reference to FIG. 29. Note that the clock circuit 152 may be a stand-alone clock circuit or it may be implemented via the processing module 130.

In an example, the drive sense circuits (DSCs) provides a signal corresponding to the DSC reference signal 164 to their respective capacitors. The capacitors will affect the signal, which is indicative of the capacitors impedance based on the equation:

$$v = \frac{1}{c}\int i*dt.$$

The DSCs generate an error signal 154-160 that are based on the detected effect on the signal. The multiplexor 162 receives the error signals 154-160 and outputs them in a serial fashion based on a select signal from the clock circuit 152. To ensure alignment of the error signals 154-160 with the selection of one of them by the multiplexer 162, the clock circuit provides a clock signal 166 to the reference circuit 150. The reference circuit 150 uses the clock signal 166 to generate the DSC reference signal 164.

Depending the feedback circuit 163, the op-amp is a unity gain op-amp (e.g., doesn't amplify the signal) or a non-unity gain op-amp (e.g., amplifies the signal). The op-amp receives the output of the multiplexer 162 and amplifies it in accordance with the feedback circuit 163 to produce an output signal. The power out circuit 260 up-converts the output signal to produce the data transmit signal 122. Note that the op-amp may be an inverting op-amp or a non-inverting op-amp.

Figure 18B:
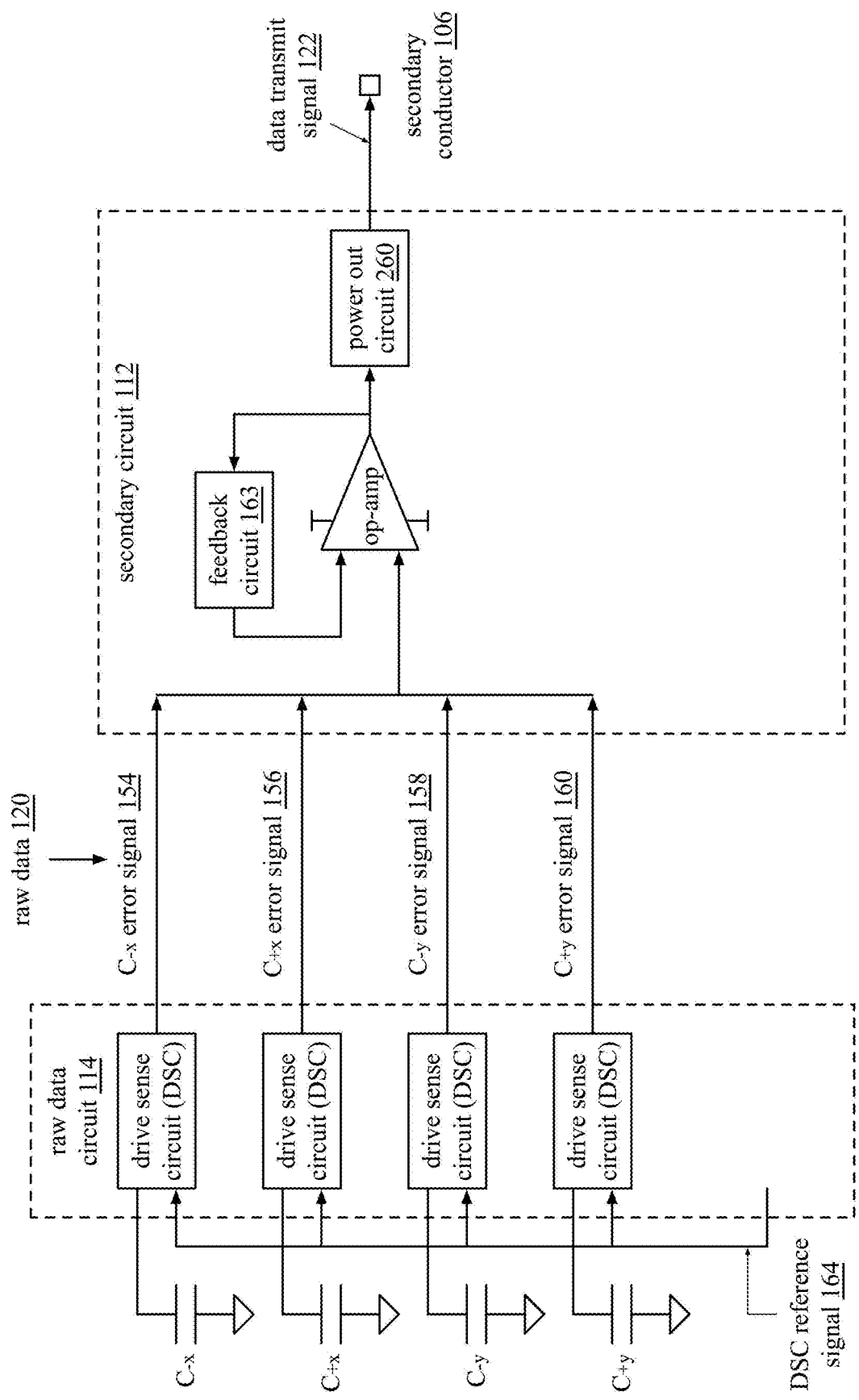
FIG. 18B is a schematic block diagram of an embodiment of a raw data circuit and a secondary circuit of an electronic pen in accordance with the present invention.

FIG. 18B is a schematic block diagram of another embodiment of a raw data circuit 114 and a secondary circuit 112 of an electronic pen 16. This embodiment is similar to the embodiment of FIG. 18A with the exception that this embodiment does not include the clock circuit 152 and the reference circuit 150. In this embodiment, the raw data circuit 114 receives a DSC reference signal 164 from the touch screen. For example, the touch screen transmits a sinusoidal signal at a specific frequency, which is received by the drive sense circuits.

FIG. 19 is a schematic block diagram of an embodiment of a reference circuit 150 and a drive sense circuit (DSC) of a raw data circuit 114. The drive sense circuit (DSC) includes an amplifier circuit 170, a feedback circuit 172, and a dependent supply source 174. The reference circuit 150 includes a DC voltage reference circuit 151, an oscillation generating circuit 153, and a summing circuit 155. The oscillation generating circuit 153 may be one or more of a crystal oscillator, a phase locked loop, a voltage controlled oscillator, a number controlled oscillator, a digital frequency synthesizer, etc.

In an example, the oscillation generating circuit 153 generates an oscillating component 165 based on the clock signal 166. The DC voltage reference circuit 151 generates a DC component 163 (e.g., a common mode voltage from Vdd and Vss, or other voltage level). The summing circuit 155 sums the DC component 163 with the oscillating component 165 to produce the DSC reference signal 164. Note that the frequency of the oscillating component may be in the range of 10's of Kilo-Hertz to Giga-Hertz depending on the size of the orientation capacitors.

The amplifier circuit 170 receives, as inputs, the DSC reference signal 164 and adjustment signal 180 (which is also the drive signal 182 and includes the effect of the signal 184). The amplifier circuit 170, the feedback circuit 172, and the dependent supply source 174 operate to keep the inputs of the amplifier circuit 170 substantially equal. To do this, the amplifier circuit 170 generates a capacitor error signal 176; the feedback circuit 172 generates a regulation signal 178 from the capacitor error signal 176; and the dependent supply source 174 generates the adjust signal 180. For a variety of implementations of the drive sense circuit and a more detailed discussion of its functionality, see co-pending patent application entitled, "DRIVE SENSE CIRCUIT WITH DRIVE-SENSE LINE", having a serial number of Ser. No. 16/113,379, and a filing date of Aug. 27, 2018.

Figure 20:
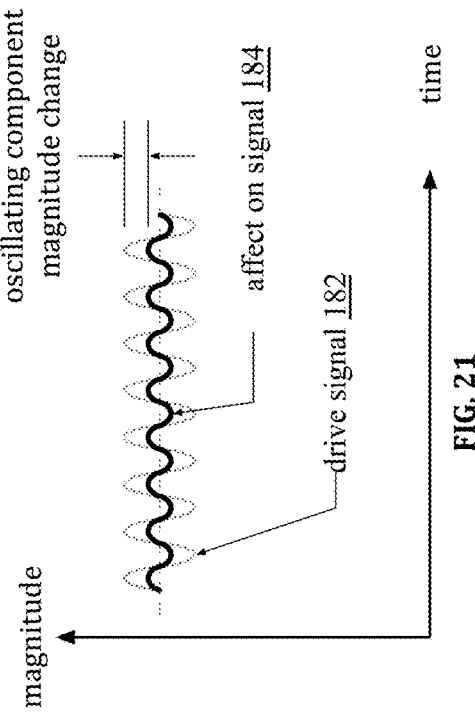
FIGS. 20-23 are diagram of examples of drive signals and affects on the drive signals in accordance with the present invention.

FIGS. 20-23 are diagram of examples of drive signals and effects on the drive signal 182 of FIG. 19. FIG. 20 is a diagram of example of the drive signal in which the electrical characteristic or change in electrical characteristic of the capacitor is affecting the signal. In this example, the effect of the electrical characteristic or change in electrical characteristic of the capacitor reduced the DC component but had little to no effect on the oscillating component. For example, the electrical characteristic is resistance. In this example, the resistance or change in resistance of the capacitor decreased the signal, inferring an increase in resistance for a relatively constant current.

Figure 21:
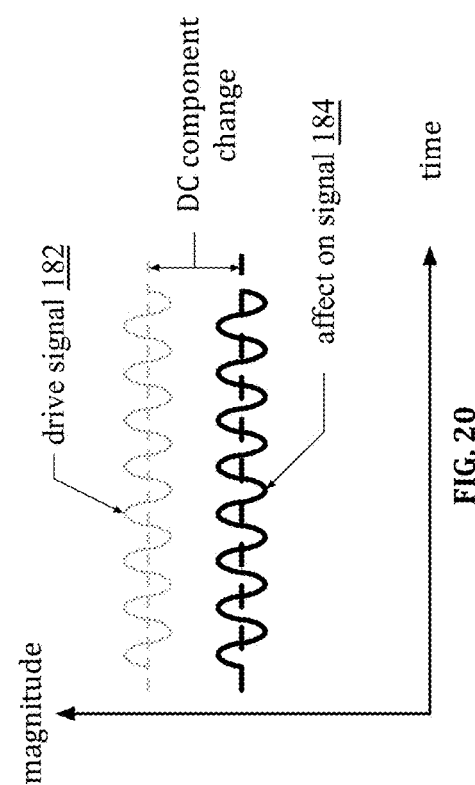

FIG. 21 is a diagram of another example of the signal in which the electrical characteristic or change in electrical characteristic of the capacitor is affecting the signal. In this example, the effect of the electrical characteristic or change in electrical characteristic of the capacitor reduces magnitude of the oscillating component but had little to no effect on the DC component. In this example, the impedance or change in impedance of the capacitor decreased the magnitude of the oscillating signal component, inferring an increase in impedance for a relatively constant current.

Figure 22:
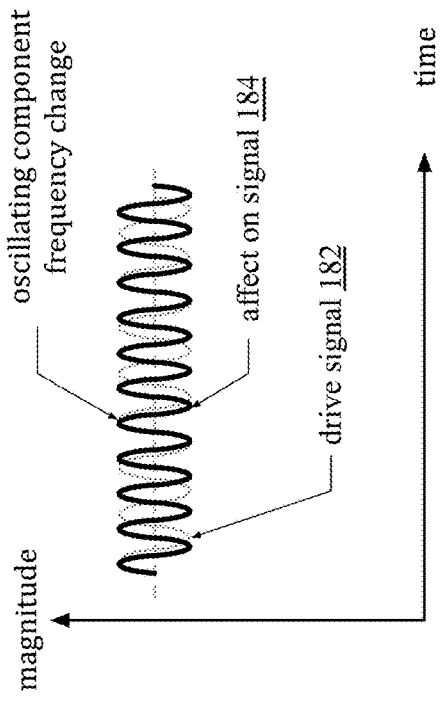

FIG. 22 is a diagram of another example of the signal in which the electrical characteristic or change in electrical characteristic of the capacitor is affecting the signal. In this example, the effect of the electrical characteristic or change in electrical characteristic of the capacitor shifted frequency of the oscillating component but had little to no effect on the DC component. In this example, the reactance or change in reactance of the capacitor shifted frequency of the oscillating signal component, inferring an increase in reactance (e.g., capacitor is functioning as an integrator or phase shift circuit).

Figure 23:
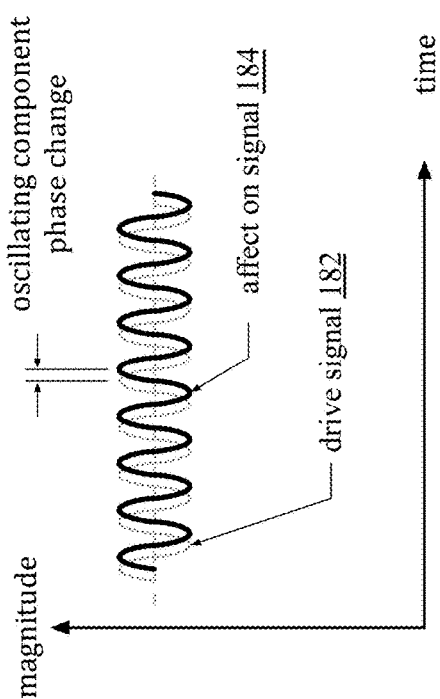

FIG. 23 is a diagram of another example of the signal in which the electrical characteristic or change in electrical characteristic of the capacitor is affecting the signal. In this example, the effect of the electrical characteristic or change in electrical characteristic of the capacitor changes the frequency of the oscillating component but had little to no effect on the DC component.

Figure 24:
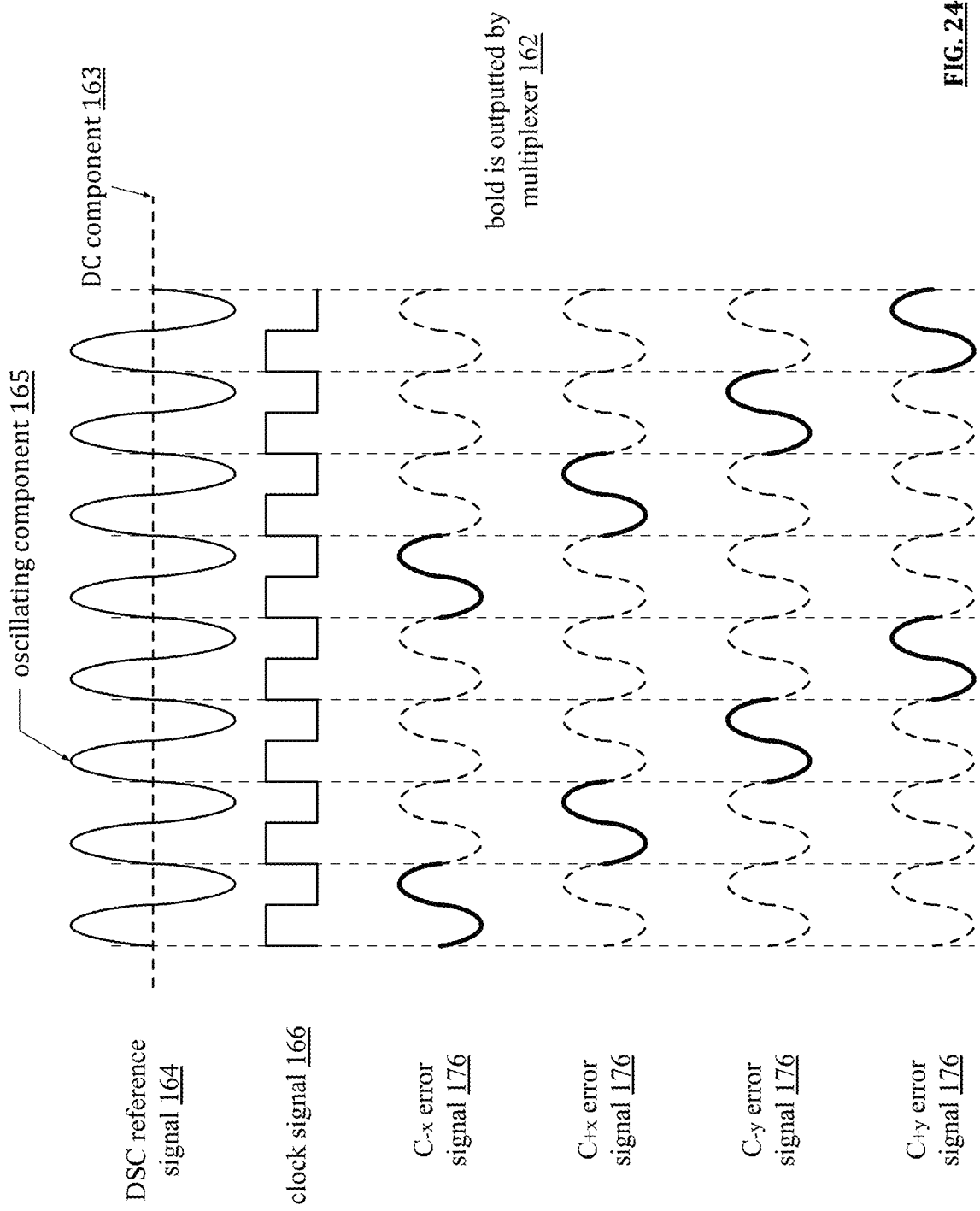
FIG. 24 is a diagram of an example of orientation signals in accordance with the present invention.

FIG. 24 is a diagram of an example of orientation signals that are produced by the raw data circuit 114 and outputted by the secondary circuit 112 of FIG. 18. In this example, the DSC reference signal 164 includes an oscillating component 163 that is in-sync and having the same frequency as the clock signal 166. Note that the frequency of the clock signal 166 may be greater or less than the frequency of the oscillating component 163.

In this example, the clock signal 162 is the selection signal for the multiplexer 162 of the secondary circuit 112. Thus, as each DSC generates their respective error signal 176, one cycle from the one of the signals is outputted by the multiplexer 162 (which is shown as the bolded cycle of each error signal). Note that more than one cycle of each error signal 176 may be outputted via the multiplexer 162.

Figure 25:
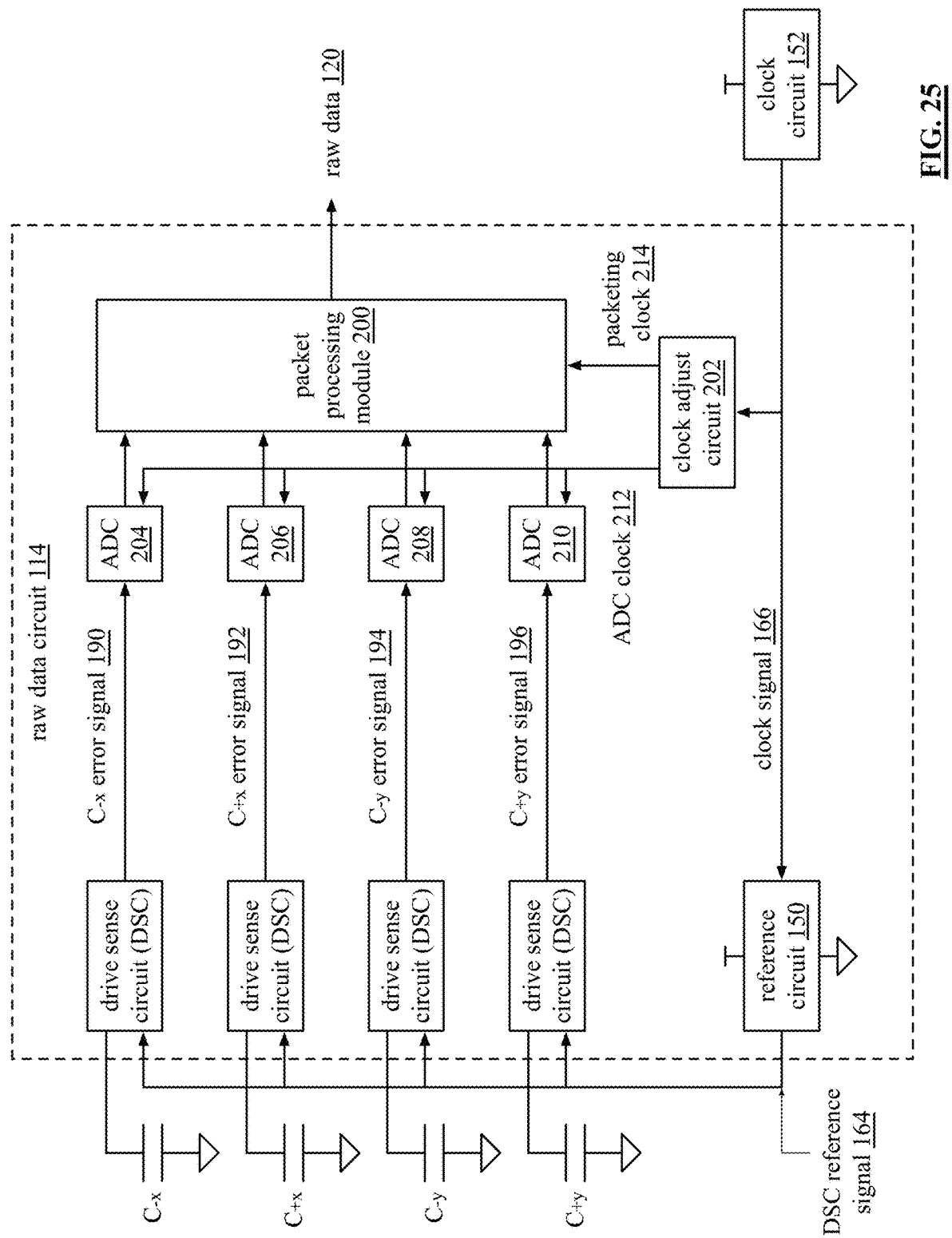
FIG. 25 is a schematic block diagram of an embodiment of a raw data circuit in accordance with the present invention.

FIG. 25 is a schematic block diagram of an embodiment of a raw data circuit 114 that includes a plurality of drive sense circuits (DSCs), the reference circuit 150, a plurality of analog to digital converters (ADC) 204-210, a clock adjust circuit 202, and a packet processing module 200. The reference circuit 150 receives a clock signal 166 from the clock circuit 1520 to produce the DSC reference signal 164 as previously discussed. The drive sense circuits operate as previously discussed to produce capacitor error signals 190-196.

The ADCs 204-210 convert the capacitor error signals 190-196 into digital error signals in accordance with an ADC clock signal 212, which is generated by the clock adjust circuit 202 based on the clock signal 166. The packet processing module 200 combines the digital error signals into the raw data 120 in accordance with a packeting clock 214, which is generated by the clock adjust circuit 202 based on the clock signal 166. The rates of the ADC clock 212 and the packeting clock 214 are dependent on the desired data rate and the bit resolution of the digital error signals. For example, if the desired data rate is 6.4 Kilo-bits-per-second (Kbps) and the bit resolution of the digital error signals is 16 bits, then 64 bits of information is produce each cycle through the four digital error signals. At a 6.k Kbps rate, 100 samples of the digital error signals are taken per second. The ADC clock 212 and the packeting clock 214 are set accordingly.

Figure 26:
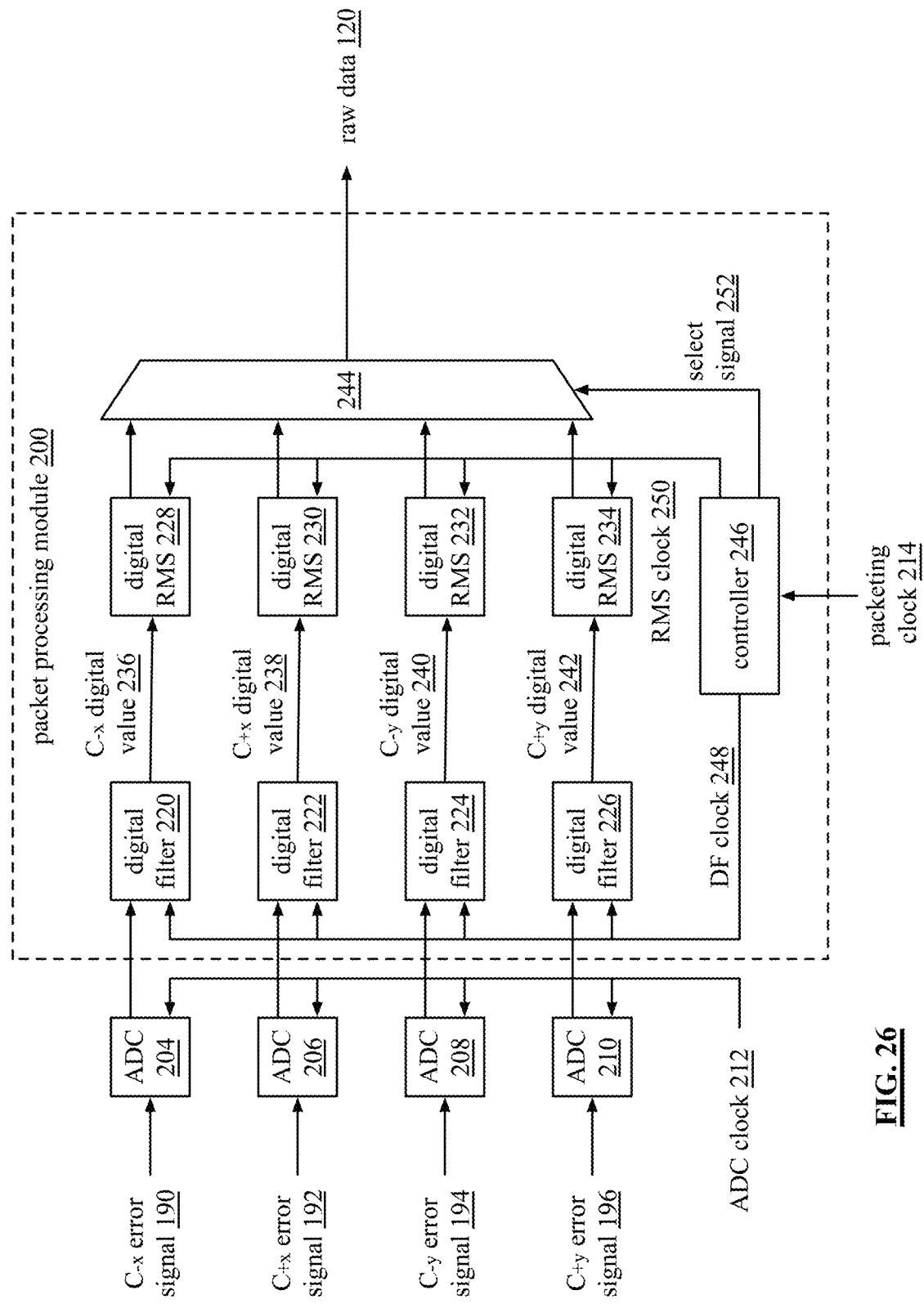
FIG. 26 is a schematic block diagram of an embodiment of a packet processing module of a raw data circuit in accordance with the present invention.

FIG. 26 is a schematic block diagram of an embodiment of a packet processing module 200 of a raw data circuit 114 of FIG. 25. The packet processing module 200 includes a plurality of digital filters 220-226, a plurality of optional digital RMS circuits 228-234, a multiplexer 244, and a controller 246. The digital filters 220-226 filter the output of their respective ADCs 204-210 in accordance with a digital filter (DF) clock signal 248, which is produced by the controller 246. For example, of an ADC is a 1-bit sigma-delta modulator, then the corresponding digital filter is a decimation or comb filter to produce a digital capacitance value (e.g., a digital value corresponding to the capacitor error signal 190-196).

The digital RMS (root-mean-square) circuits 228-234, if included, convert their respective digital value 228-234 into a digital RMS value in accordance with an RMS clock signal 250, which is produced by the controller 246. The multiplexer 244 outputs the digital RMS values in accordance with a select signal 252, which is produced by the controller 246. In this manner, digital raw data 120 is sent to the touch screen processing module for further processing.

FIG. 27 is a schematic block diagram of an embodiment of a secondary circuit 112 of an electronic pen 16 receiving raw data 120 from a raw data circuit 114. The secondary circuit 112 includes a digital to analog circuit 150, an operational amplifier (op-amp) a power output circuit 260, and a feedback circuit 152. The digital to analog circuit 150 includes an analog to digital converter and may further include additional digital filtering and/or a buffer. An embodiment of the op-amp and feedback circuit 150 is shown in FIG. 28 and an embodiment of the power output circuit 260 is shown in FIG. 29, both will subsequently be discussed.

In this embodiment, the raw data 120 is digitized, as previously discussed, and is received in data frames. A frame of raw data includes a header section, a data section, and may further include a footer section. The header section includes a unique binary pattern such that it is recognizable as the header. For example, the header includes 16 bits, the first 8 bits are logic ones and the second 8 bit are logic zeros. The data section may be partitioned in bit or byte size to correspond to the data being received. For example, if the data being received is the digital values of the four orientation capacitors of FIG. 26 and each digital value is 8 bits, then the data section is divided into four sections of 8 bits per section.

The footer section of a data frame is optional. If included, the footer section includes a unique bit pattern such that it is recognized as the footer section. For example, the footer section is 16 bits; the first 8 bits are logic zero and the second 8 bits are logic one. The footer section can be omitted if the size of the data section is known, which can be done in a variety of ways. For example, the header section includes a frame size field that indicates the size of the frame and/or of the data section. As another example, the number of data sections and their respective bit sizes is known, thus the size of the data section is readily determined.

In an example of operation, the digital to analog circuit 150 converts the raw data 120 into analog raw data 154. The op-amp, which may be an inverting op amp or a non-inverting op amp, amplifies the analog raw data 154 in accordance with the gain provided by the feedback circuit 152. The power out circuit 260 up-converts the amplified raw data to produce the data transmit signal 120. As an example, the power out circuit 260 up-convers the amplified raw data by increasing the voltage and/or current of the amplified raw data. As another example, the power out circuit 260 modules the amplified raw data with a carrier signal to produce the data transmit signal 120.

FIG. 28 is a schematic block diagram of an embodiment of an operational amplifier circuit (op amp) and feedback circuit 152 of FIG. 27 (collectively an operational amplifier circuit). The feedback circuit 152 includes the capacitor (C) and resistors R1 and R2. The values of R1, R2, and C establish the frequency response for the operational amplifier circuit. For example, a ratio between R1 and R2 establishes the gain of the circuit and R-C time constant of R1//R2 and C establishes the corner frequency.

In an example, the operational amplifier circuit amplifies the analog raw data 154 based on the frequency response to produce a data signal 123. Since the operational amplifier circuit is inverting in an embodiment, where the data signal is an inverting and amplified version of the analog raw data 154.

FIG. 29 is a schematic block diagram of an embodiment of a power output circuit 260 that includes a biasing transistor and an inverting & amplifying transistor, which are high voltage transistors. The biasing transistor's gate is coupled to a bias voltage, its drain is coupled to a high-voltage power supply (e.g., 30-60 Volts), and its source is couple to the drain of the inverting & amplifying transistor. The source of the inverting & amplifying transistor is coupled to ground and its gate is coupled to receive the data signal 123, which is an amplified and inverted version of the analog raw data 154. The drain of the inverting & amplifying transistor provides the output of the power out circuit 260, which is the data transmit signal 122.

Figure 30:
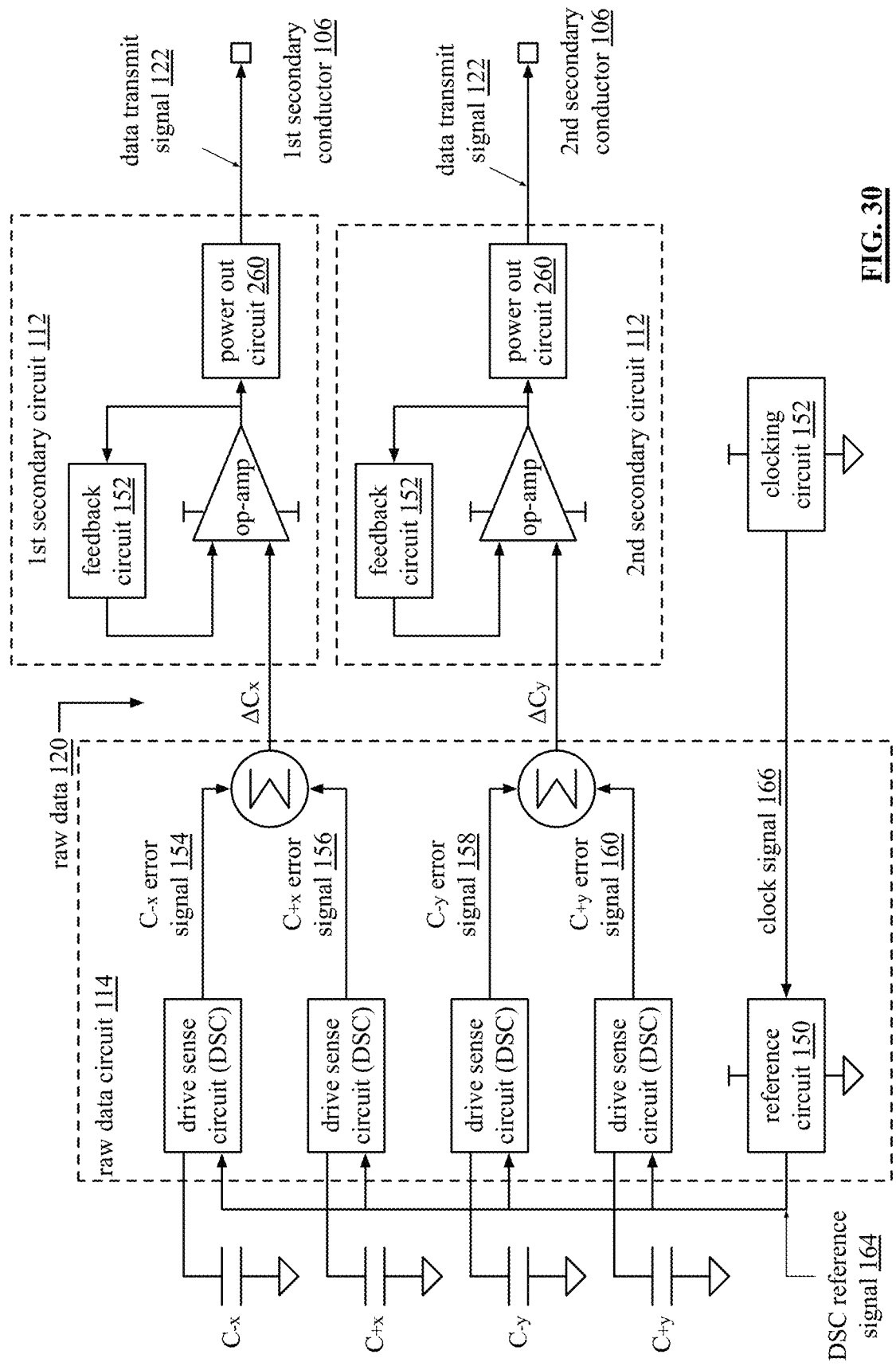
FIG. 30 is a schematic block diagram of another embodiment of a raw data circuit and two secondary circuits of an electronic pen in accordance with the present invention.

FIG. 30 is a schematic block diagram of another embodiment of a raw data circuit 114 and two secondary circuits 112 of an electronic pen 16. The raw data circuit 114 includes a plurality of drive sense circuits (DSCs) and a reference circuit 150 as previously discussed with reference to FIG. 18. In this embodiment, the raw data circuit further includes two subtraction modules. The first subtracts the C−x error signal 154 from the C+x error signal 156 to produce a difference Cx error signal (ΔCx) and the second subtracts the C−y error signal 158 from the C+y error signal 160 to produce a difference Cy error signal (ΔCy).

Assume that, when the pen 16 is not being tilted, C−x equals C+x and C−y equals C+y. Thus, C−x error signal 154 equal C+x error signal 156 and C−y error signal 158 equal C+y error signal 160. With these errors signals being equal, each of the difference Cx error signal (ΔCx) and the difference Cy error signal (ΔCy) equal zero. When a tilt occurs, the error signals will not be equal, thus the difference Cx error signal (ΔCx) and/or the difference Cy error signal (ΔCy) will not be zero. The non-zero values of the difference Cx error signal (ΔCx) and/or the difference Cy error signal (ΔCy) are processed by the touch screen processing module 82 (of FIGS. 2 and 3) to determine the tilt of the pen.

The first and second secondary circuits 112 convey the difference Cx error signal (ΔCx) and the difference Cy error signal (ΔCy) to the touch screen processing module 82. Each of the first and second secondary circuits 112 includes an op-amp, a feedback circuit 152, and a power out circuit 260, which function as previously discussed with reference to FIG. 27. As an alternative to using two secondary circuits 112, the difference Cx error signal (ΔCx) and the difference Cy error signal (ΔCy) are multiplexed and outputted by a single secondary circuit 112.

Figure 31:
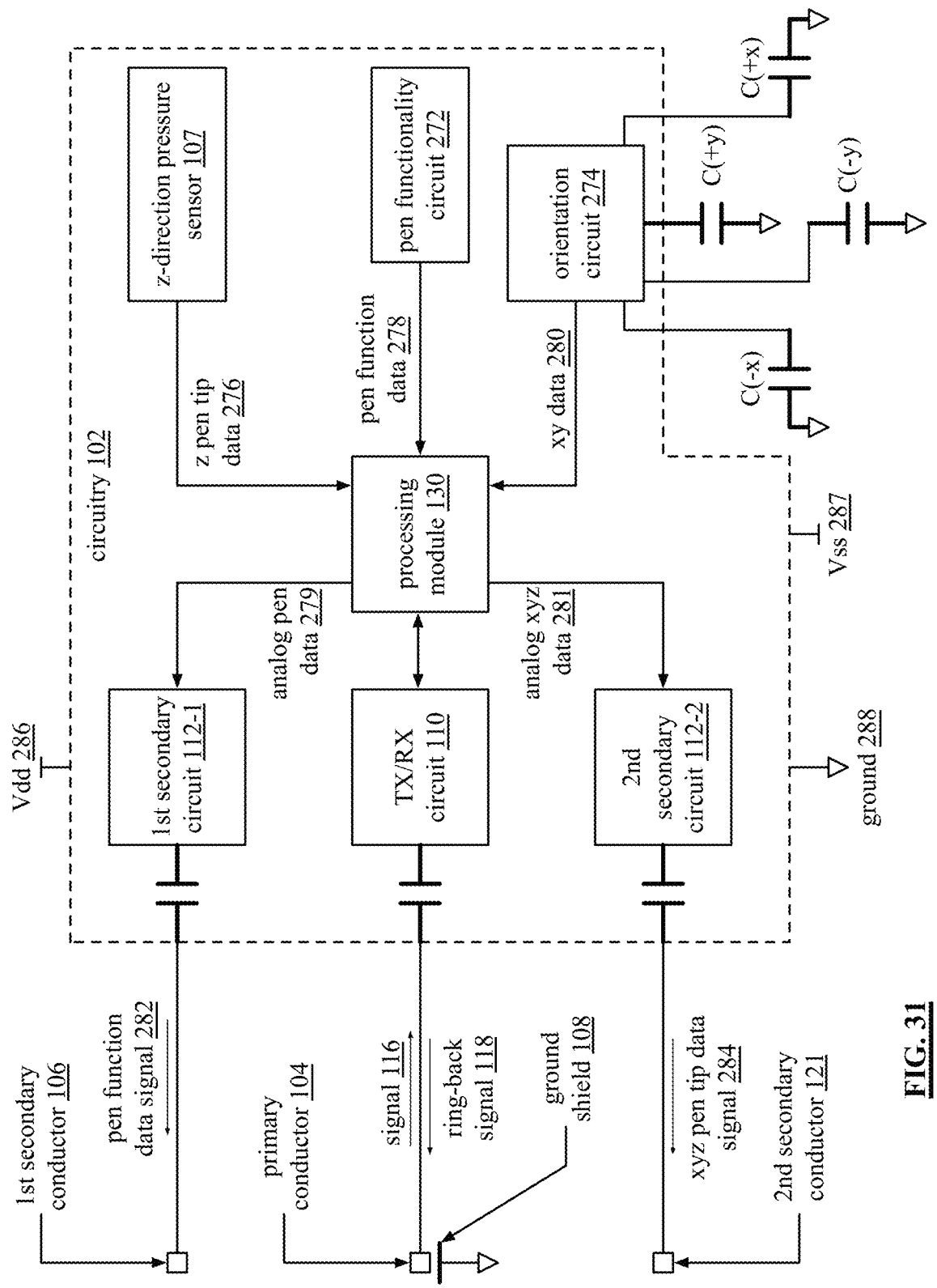
FIG. 31 is a schematic block diagram of another embodiment of an electronic pen in accordance with the present invention.

FIG. 31 is a schematic block diagram of another embodiment of an electronic pen 16 that includes the circuitry 102, the primary conductor 104, the $1^{st}$ secondary conductor 106, the $2^{nd}$ secondary conductor 121, shielding 108, and the orientation capacitors (C−x, C+x, C−y, and C+y). The circuitry 102 includes the TX/RX circuit 110, the $1^{st}$ secondary circuit 112-1, the $2^{nd}$ secondary circuit 112-2, the processing module 130, the z-direction pressure sensor 107, a pen functionality circuit 272, and an orientation circuit 274. The circuit 102 is coupled to a supply voltage that has one or more rail to rail voltages of Vdd 286 and Vss 287. From Vdd and Vss, a ground reference 288 is established (e.g., a voltage approximately equal to ½ of the difference between Vdd and Vss).

In an example, the z-direction pressure sensor 107 produces z-direction pen tip data 276 in a raw data form as previously discussed. The orientation circuit 274 generates xy data 280 (e.g., tilt data) based on the capacitance values of the orientation capacitors (C−x, C+x, C−y, and C+y). Embodiments of the orientation circuit 274 were discussed with reference to FIGS. 18, 25, and 30. The processing module 130 generates analog xyz data 281 based on the z-direction pen tip data 276 and the xy data 280 and provides it to the $2^{nd}$ secondary circuit 112-2. The $2^{nd}$ secondary circuit 112-2 generates an xyz pen tip data signal 284 based on the analog xyz data 281. In addition, the $2^{nd}$ secondary circuit 112-2 transmits the xyz pen tip data signal 284 to the touch screen via the $2^{nd}$ secondary conductor 121. In this example, the $2^{nd}$ secondary circuit is capacitively coupled to the $2^{nd}$ secondary conductor 121. Alternatively, the $2^{nd}$ secondary circuit is directly coupled to the $2^{nd}$ secondary conductor 121.

In another example, the TX/RX circuit 110 receives a signal 116 via the primary conductor 104 from the touch screen. When the signal 116 does not include an embedded data message, the TX/RX circuit 110 generates a ring-back signal 118, which it transmits to the touch screen via the primary conductor 104. In this example, the TX/RX circuit 110 is capacitively coupled to the primary conductor 104. Alternatively, the TX/RX circuit 110 is directly coupled to the primary conductor 104.

When the signal 116 includes an embedded data message, the TX/RX circuit 110 extracts the data message and provides it to the processing module 130. The processing module 130 generates a message response and sends it to the TX/RX circuit 130. The TX/RX circuit 110 embeds the message response in the ring-back signal 118. Various embodiments of the TX/RX circuit 110 are previously discussed.

In yet another example, the pen functionality circuit 272 generates pen functional data 278, which is in a raw data format. The pen functional data 278 may be regarding a variety of pen functions. For example, the pen functional data 278 is regarding power data of the battery and/or power supply providing power to the electronic pen 16. As another example, the pen functional data 278 is regarding selection of a button or switch for one or more of color change, write thickness, paint mode, draw mode, erasure mode, etc.

The processing module 130 generates analog pen data 279 based on the pen functional data 278 and provides it to the $1^{st}$ secondary circuit 112-1. The $1^{st}$ secondary circuit 112-1 generates a pen function data signal 282 based on the analog pen data 279. In addition, the $1^{st}$ secondary circuit 112-1 transmits the pen functional data signal 282 to the touch screen via the $1^{st}$ secondary conductor 106. In this example, the $1^{st}$ secondary circuit is capacitively coupled to the $1^{st}$ secondary conductor 106. Alternatively, the $1^{st}$ secondary circuit is directly coupled to the $1^{st}$ secondary conductor 106.

Figure 32:
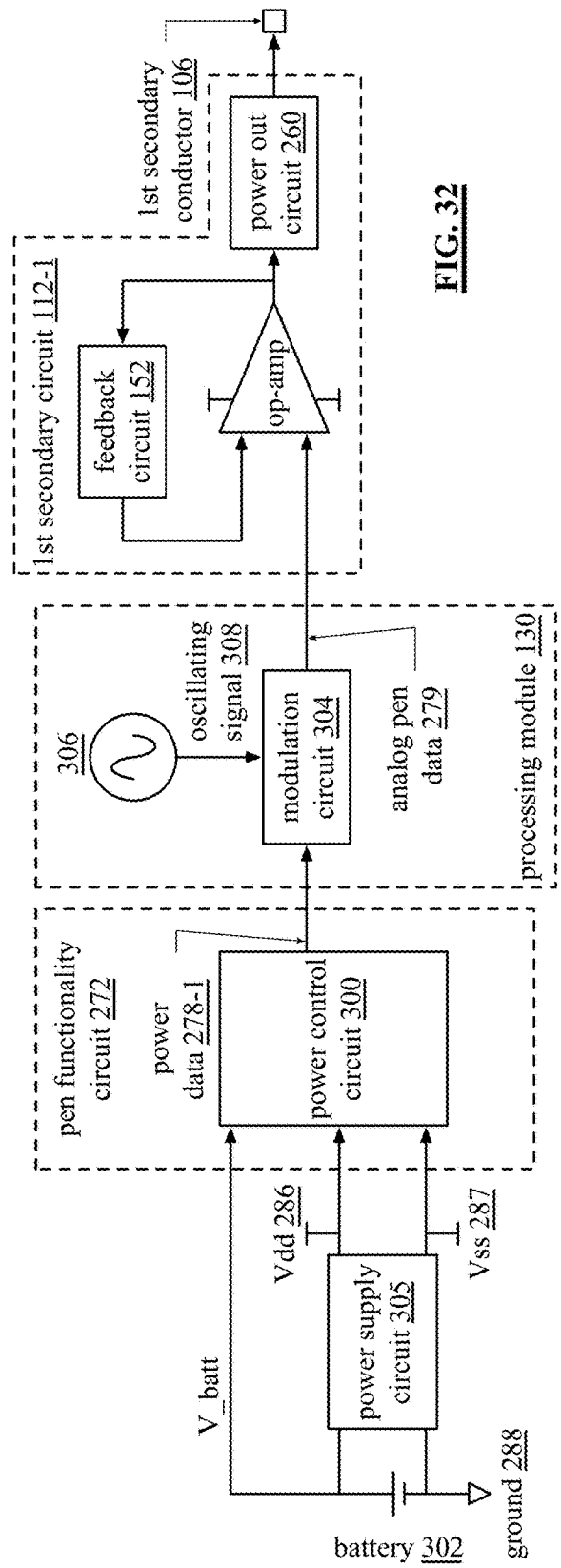
FIG. 32 is a schematic block diagram of an embodiment of a power supply, a pen functionality circuit, a processing module, and a secondary circuit of an electronic pen in accordance with the present invention.

FIG. 32 is a schematic block diagram of an embodiment of a power supply 305, a pen functionality circuit 272, a processing module 130, and a secondary circuit 112-1 of an electronic pen 16. The power supply circuit 305 is coupled to a battery 302, which powers the pen 16. The power supply circuit 305 may be implemented in a variety of ways. For example, the power supply circuit 305 is a DC-to-DC converter using one or more topologies (e.g., buck, boost, fly-back, half bridge, etc.). As another example, the power supply circuit 305 includes one or more linear regulators. Regardless of the particular construct of the power supply circuit 35, the power supply circuit 35 generates, from the battery voltage (v_batt), one or more positive rail voltages (Vdd) 286, one or more negative rail voltages (Vss) 287, and a ground reference 288.

The pen functionality circuit 272 includes a power control circuit 300, which receives the battery voltage, the positive rail voltage(s), and the negative rail voltage(s) as inputs. In an embodiment, the power control circuit 300 includes a battery charger to charge the battery 302. In addition, the power control circuit 300 monitors the charging of the battery (e.g., charge current, charge level, trickle current, etc.) and produces power data 278-1 therefrom.

In another embodiment or in furtherance of the previous embodiment, the power control circuit includes a volt meter and/or current meter to determine voltage, current, and/or power usage of the pen and/or drain on the battery. This information comprises, or is added to, the power data 278-1. The power data 278-1 may be analog data or digital data.

The processing module 130 is configured to include an oscillation generator 306 and a modulation circuit 304. The oscillation generator 306, which may be a phase locked look, a voltage controlled oscillator, a crystal oscillator, a number controlled oscillator, or a digital frequency synthesizer, generates an oscillation signal 308. In an embodiment, the oscillation signal 308 is a sinusoidal signal having a frequency in the range of a few KHz to tens of GHz.

The modulation circuit 304 modulates the oscillation signal 308 with the power data 278-1 to produce the analog pen data 279. In an embodiment, the modulation circuit 304 amplitude shift keying (ASK), phase shift keying (PSK), and/or amplitude modulation (AM) modulates the oscillation signal 308 based on the power data 278-1 to produce the analog pen data 279. The $1^{st}$ secondary circuit 112-1, which includes the op-amp, the feedback circuit 152, and the power out circuit 260, outputs an up-converted version of the analog pen signal to the touch screen via the $1^{st}$ secondary conductor 106.

Figure 33:
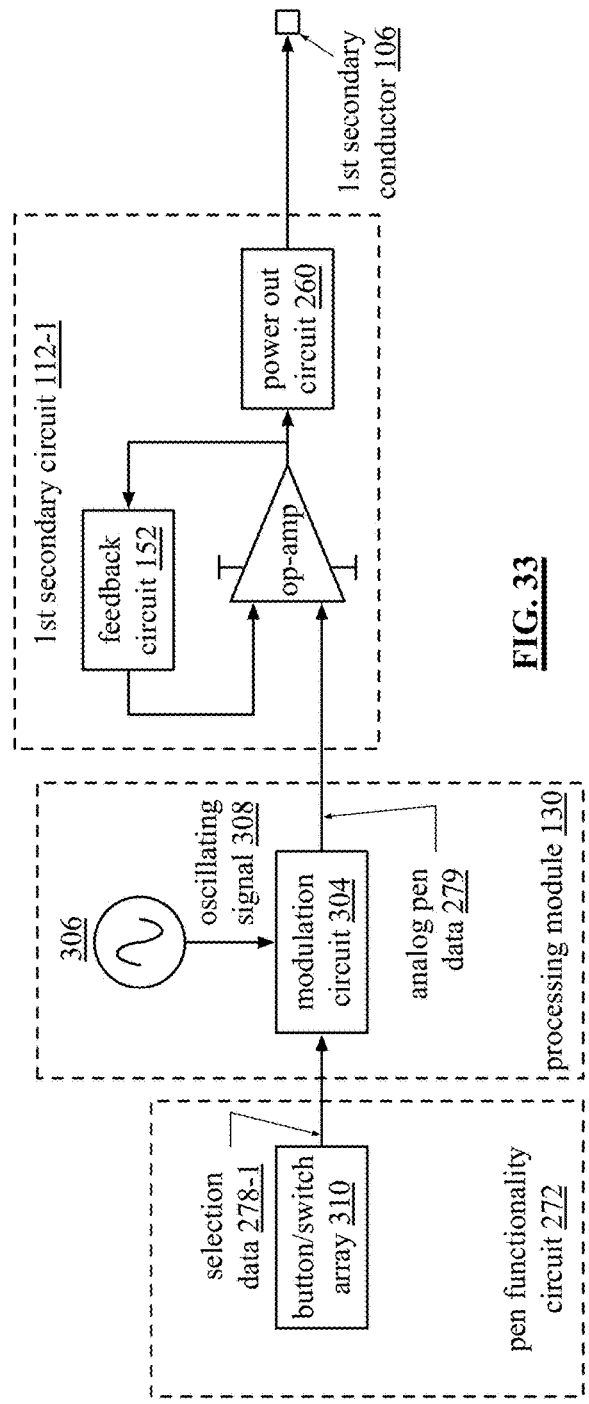
FIG. 33 is a schematic block diagram of another embodiment of a pen functionality circuit, a processing module, and a secondary circuit of an electronic pen in accordance with the present invention.

FIG. 33 is a schematic block diagram of another embodiment of a pen functionality circuit 272, the processing module 130, and the $1^{st}$ secondary circuit 112-1 of an electronic pen 16. In this embodiment, the pen functionality circuit 272 includes a button and/or switch array 310 that includes one or more switches and/or one or more buttons. The button/switch array 310 enables a user of pen to select certain pen features such as pen color, pen tip thickness, paint mode, draw mode, erasure or pen mode, etc. to produce selection data 278-1. For example, when a first switch is open (or a button is not pushed), the electronic pen 16 is in a pen mode and, when the switch is closed (or button is pressed), the electronic pen 16 is in an eraser mode.

The processing module 130 includes the oscillation generator 306 and modulation circuit 304, which function as previously discussed to create the analog pen data 279 from the selection data 278-1. The $1^{st}$ secondary circuit 112-1, which includes the op-amp, the feedback circuit 152, and the power out circuit 260, outputs an up-converted version of the analog pen signal to the touch screen via the $1^{st}$ secondary conductor 106.

Figure 34:
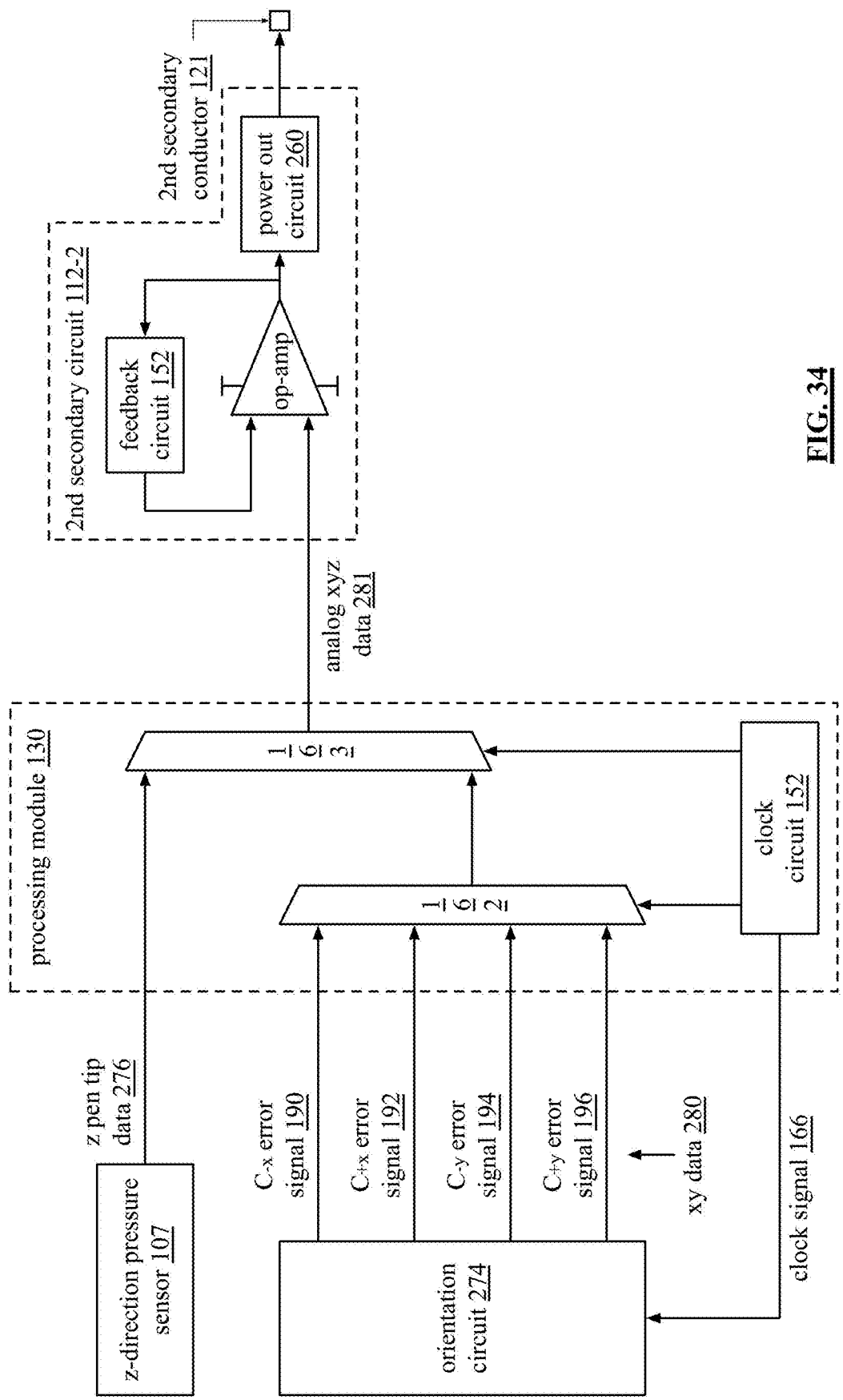
FIG. 34 is a schematic block diagram of an embodiment of a z-direction pressure sensor, an orientation circuit, a processing module, and a secondary circuit of an electronic pen in accordance with the present invention.

FIG. 34 is a schematic block diagram of an embodiment of a z-direction pressure sensor 107, the orientation circuit 274, the processing module 130, and the $2^{nd}$ secondary circuit 112-2 of an electronic pen 16. The z-direction pressure sensor 107 generates z pen tip data 276 as previously discussed. the orientation circuit 278 is coupled to the orientation capacitors (not shown in this figure) to produce capacitor error signals 190-196 as previously discussed with reference to FIG. 18.

The processing module 130 includes the clock circuit 152, multiplexer 162, and multiplexer 163. The clock circuit 152 generates control signals for the multiplexers 162 and 163 such that the processing module 30 outputs the analog xyz data 281. For example, the processing module outputs, in a repetitive order, the C−x error signal, the C+x error signal, the C−y error signal, the C+y error signal, and the z pen tip data 276 as the analog xyz data 281. The $2^{nd}$ secondary circuit 112-2, which includes the op-amp, the feedback circuit 152, and the power out circuit 260, outputs an up-converted version of the analog xyz data 281 to the touch screen via the $2^{nd}$ secondary conductor 121.

Figure 35:
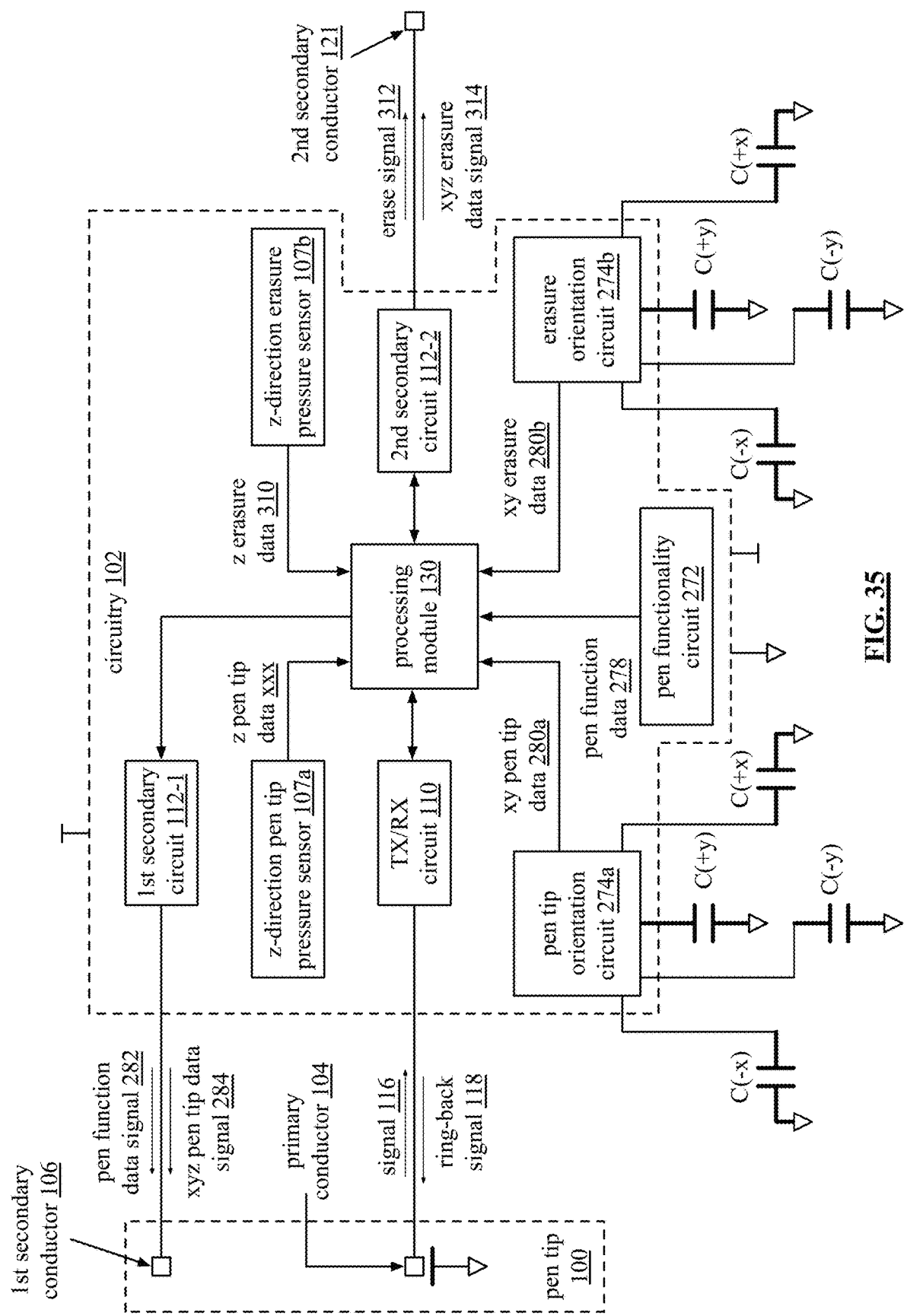
FIG. 35 is a schematic block diagram of another embodiment of an electronic pen in accordance with the present invention.

FIG. 35 is a schematic block diagram of another embodiment of an electronic pen 16 that includes the circuitry 102, the pen tip 100, and the erasure tip, which includes the $2^{nd}$ secondary conductor 121. The pen tip 100 includes the primary conductor 104, the $1^{st}$ secondary conductor and the shielding 108. This embodiment includes two sets of orientation capacitors (C−x, C+x, C−y, and C+y); one for the pen tip and second one for the erasure tip. The circuitry 102 includes the TX/RX circuit 110, the $1^{st}$ secondary circuit 112-1, the $2^{nd}$ secondary circuit 112-2, the processing module 130, a z-direction pen tip pressure sensor 107a, a z-direction erasure tip pressure sensor 107b, the pen functionality circuit 272, a pen tip orientation circuit 274a, and an erasure orientation circuit 274b. The circuit 102 is coupled to a supply voltage that has one or more rail to rail voltages of Vdd 286 and Vss 287. From Vdd and Vss, a ground reference 288 is established (e.g., a voltage approximately equal to ½ of the difference between Vdd and Vss).

The circuitry 102 operates similarly to the circuitry of FIG. 31 with differences being the $2^{nd}$ secondary conductor 121 and $2^{nd}$ secondary circuit 112-2 are used for the erasure end of the pen 16. The z-direction erasure pressure sensor 107b and the erasure orientation circuit 274b operate similarly to the z-direction erasure pressure sensor 107a and the erasure orientation circuit 274a, but for the erasure end of the pen. In addition, the $1^{st}$ secondary conductor 104 and the $1^{st}$ secondary circuit 112-1 are used for both the xyz pen tip data 284 and the pen function data signal 282.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. An electronic pen comprises:
    a pen tip that includes:
        a primary conductor;
        a secondary conductor; and
        shielding between the primary conductor and the secondary conductor;
    circuitry that includes:
        a transmit/receive circuit operably coupled to the primary conductor, wherein the transmit/receive circuit is operable to:
            receive a signal from a touch screen via the primary conductor;
            generate a ring-back signal based on the signal; and
            transmit the ring-back signal via the primary conductor to the touch screen;
        a raw data circuit operable to generate raw data regarding the electronic pen; and
        a secondary circuit operably coupled to the secondary conductor, wherein the secondary circuit is operable to:
            receive the raw data from the raw data circuit;
            up-convert the raw data into a data transmit signal; and
            transmit the data transmit signal via the secondary conductor to the touch screen; and
    a shell, wherein the circuitry is mounted within the shell and the pen tip is coupled to the shell.

2. The electronic pen of claim 1, wherein the transmit/receive circuit comprises:
    an amplifier circuit;
    a feedback circuit operably coupled to the amplifier circuit;
    a dependent supply circuit operably coupled to the amplifier circuit and to the feedback circuit; and
    a reference circuit operable to produce a reference signal, wherein:
        the amplifier circuit generates a comparison signal based on the signal from the touch screen and the reference signal;
        the feedback circuit generates a regulation signal based on the comparison signal; and
        the dependent supply source generates an adjustment signal based on the regulation signal,
        wherein the adjustment signal adjusts the signal to produce the ring-back signal.

3. The electronic pen of claim 2, wherein the transmit/receive circuit further comprises:

an analog to digital converter operable to convert the comparison signal into a digital representation of an inversion of the signal.

4. The electronic pen of claim 3, wherein the circuitry further comprises:
a processing module operable to:
receive the digital representation of the inversion of the signal;
extract a data message from the digital representation of the inversion of the signal; and
process the data message to:
generate a message response; or
generate a pen command.

5. The electronic pen of claim 1 further comprises:
a set of orientation capacitors; and
the raw data circuit including an orientation circuit operably coupled to the set of orientation capacitors, wherein the orientation circuit is operable to:
detect a set of electrical characteristics of the set of orientation capacitors; and
send the set of electrical characteristics to the secondary circuit.

6. The electronic pen of claim 1, wherein the secondary circuit comprises:
an operational amplifier circuit;
a feedback circuit; and
a power output circuit, wherein:
an input of the operational amplifier circuit receives the raw data,
the feedback circuit is coupled to a second input and an output of the operational amplifier to provide a gain for the operational amplifier circuit;
the power output circuit operable to up-convert a signal outputted by the operational amplifier to produce the data transmit signal.

7. The electronic pen of claim 1 further comprises:
a plurality of orientation capacitors; and
wherein the raw data circuit includes:
a plurality of drive sense circuits operably coupled to the plurality of orientation capacitors to produce capacitor orientation data as the raw data, wherein a first drive sense circuit of the plurality of drive sense circuits is coupled to a first orientation capacitor of the plurality of orientation capacitors, wherein the first drive sense circuit is operable to:
generate a drive signal in accordance with a regulation signal;
supply the drive signal to the first orientation capacitor;
detect an effect on the drive signal based on an electrical characteristic of the first orientation capacitor;
generate an error signal based on the effect on the drive signal and a reference signal;
generate the regulation signal based on the error signal; and
output the error signal as a component of the raw data.

8. The electronic pen of claim 1, wherein the raw data circuit comprises:
a power control circuit operable to generate power data as the raw data based power operation of the electronic pen.

9. The electronic pen of claim 1 further comprises:
a second secondary circuit operably coupled to a second secondary conductor, wherein the second secondary circuit is operable to:

receive a second portion of the raw data from the raw data circuit;
up-convert the second portion of the raw data into a second data transmit signal; and
transmit the second data transmit signal to the touch screen.

10. An electronic pen comprises:
a primary conductor;
a secondary conductor;
shielding between the primary conductor and the secondary conductor;
a transmit/receive circuit operably coupled to the primary conductor, wherein the transmit/receive circuit is operable to:
receive a signal via the primary conductor;
generate a ring-back signal based on the signal; and
transmit the ring-back signal via the primary conductor to the touch screen;
a plurality of orientation capacitors;
an orientation circuit operably coupled to the plurality of orientation capacitors, wherein the orientation circuit, when operable, functions to generate orientation data based on an electrical characteristic change of an orientation capacitor of the plurality of orientation capacitors; and
a secondary circuit operably coupled to the secondary conductor, wherein the secondary circuit is operable to:
receive the orientation data;
up-convert the orientation data into a data transmit signal; and
transmit the data transmit signal via the secondary conductor.

11. The electronic pen of claim 10, wherein the transmit/receive circuit comprises:
an amplifier circuit;
a feedback circuit operably coupled to the amplifier circuit;
a dependent supply circuit operably coupled to the inverting amplifier and to the feedback circuit; and
a reference circuit operable to produce a reference signal, wherein:
the amplifier circuit generates a comparison signal based on the signal and the reference signal;
the feedback circuit generates a regulation signal based on the comparison signal; and
the dependent supply source generates an adjustment signal based on the regulation signal,
wherein the adjustment signal adjusts the signal to produce the ring-back signal.

12. The electronic pen of claim 11, wherein the transmit/receive circuit further comprises:
an analog to digital converter operable to convert the comparison signal into a digital representation of an inversion of the signal.

13. The electronic pen of claim 12 further comprises:
a processing module operable to:
receive the digital representation of the inversion of the signal;
extract a data message from the digital representation of the inversion of the signal; and
process the data message to:
generate a message response; or
generate a pen command.

14. The electronic pen of claim 10, wherein the secondary circuit comprises:
- an operational amplifier circuit;
- a feedback circuit; and
- a power output circuit, wherein:
  - an input of the operational amplifier circuit receives the raw data,
  - the feedback circuit is coupled to a second input and an output of the operational amplifier to provide a gain for the operational amplifier circuit;
  - the power output circuit operable to up-convert a signal outputted by the operational amplifier to produce the data transmit signal.

15. The electronic pen of claim 10 further comprises:
- a power control circuit operable to generate power data based power operation of the electronic pen.

16. The electronic pen of claim 15 further comprises:
- a second secondary circuit operably coupled to a second secondary conductor, wherein the second secondary circuit is operable to:
  - receive the power data;
  - up-convert the power data into a second data transmit signal; and
  - transmit the second data transmit signal to the touch screen.

* * * * *